US011468384B2

(12) United States Patent
Kulkarni

(10) Patent No.: US 11,468,384 B2
(45) Date of Patent: Oct. 11, 2022

(54) SCENARIO EVALUATION AND PROJECTION USING MONTE CARLO SIMULATION AND MACHINE LEARNING

(71) Applicant: Neil Pradeep Kulkarni, Wayne, PA (US)

(72) Inventor: Neil Pradeep Kulkarni, Wayne, PA (US)

(*) Notice: Subject to any disclaimer, the term of this patent is extended or adjusted under 35 U.S.C. 154(b) by 95 days.

(21) Appl. No.: 16/409,570

(22) Filed: May 10, 2019

(65) Prior Publication Data
US 2020/0356919 A1 Nov. 12, 2020

(51) Int. Cl.
| | |
|---|---|
| *G06Q 10/00* | (2012.01) |
| *G06Q 10/06* | (2012.01) |
| *G06F 17/18* | (2006.01) |
| *G06F 30/20* | (2020.01) |
| *G06Q 40/06* | (2012.01) |
| *G06Q 40/00* | (2012.01) |

(52) U.S. Cl.
CPC ......... *G06Q 10/0635* (2013.01); *G06F 17/18* (2013.01); *G06F 30/20* (2020.01); *G06Q 40/06* (2013.01); *G06Q 40/10* (2013.01)

(58) Field of Classification Search
CPC .... G06Q 10/0635; G06Q 40/06; G06Q 40/10; G06F 17/18; G06F 30/20; G06F 2111/08; G06F 30/27; G06N 7/005; G06N 20/00
USPC ....................................................... 705/7.28
See application file for complete search history.

(56) References Cited

U.S. PATENT DOCUMENTS

| | | | | |
|---|---|---|---|---|
| 7,016,870 B1* | 3/2006 | Jones | ..................... | G06Q 40/00 705/35 |
| 7,577,597 B1* | 8/2009 | Allison | ................ | G06Q 20/102 235/379 |
| 7,877,308 B1* | 1/2011 | Padgette | ................ | G06Q 40/06 705/35 |
| 8,185,463 B1* | 5/2012 | Ball | ........................ | G06Q 10/10 705/36 R |
| 8,930,253 B1* | 1/2015 | Ball | ........................ | G06Q 40/00 705/36 R |

(Continued)

OTHER PUBLICATIONS

"Session 015—The Science Behind a Successful Retirement" of 2019 Life & Annuity Symposium, Presenters: Nicholas Carbo and Douglas Robbins, Presented on May 20, 2019.

*Primary Examiner* — Rutao Wu
*Assistant Examiner* — Tyrone E Singletary
(74) *Attorney, Agent, or Firm* — Edlavitch Law PLLC

(57) ABSTRACT

Described herein are improved systems and methods for overcoming technical problems associated with the use of Monte Carlo simulation methods, such as problems associated with applications of Monte Carlo simulation methods that are searching for more definite answers. In some embodiments described herein, improved systems and methods overcome the technical problem of the results of Monte Carlo simulations providing approximations and/or non-optimal results (or at least non-enhanced results). Thus, such embodiments can provide more enhanced answers to limiting risks; and in some cases, such embodiments can even provide optimal answers to limiting risks. In some embodiments, machine learning can be used to provide more enhanced answers to limiting risks; and in some cases, such embodiments can use machine learning to provide optimal answers to limiting risks discovered through Monte Carlo simulations.

20 Claims, 9 Drawing Sheets

(56) References Cited

U.S. PATENT DOCUMENTS

| | | | |
|---|---|---|---|
| 9,928,552 B1 | 3/2018 | Berlin et al. | |
| 2002/0010667 A1* | 1/2002 | Kant | G06F 17/13 |
| | | | 705/35 |
| 2003/0115125 A1* | 6/2003 | Lee | G06Q 40/06 |
| | | | 705/36 R |
| 2007/0156555 A1* | 7/2007 | Orr | G06Q 10/04 |
| | | | 705/35 |
| 2007/0244777 A1* | 10/2007 | Torre | G06Q 40/06 |
| | | | 705/35 |
| 2009/0222297 A1* | 9/2009 | Cao | G06Q 30/0283 |
| | | | 705/400 |
| 2010/0179920 A1* | 7/2010 | Snodgrass | G06Q 40/00 |
| | | | 705/36 R |
| 2011/0282806 A1* | 11/2011 | Wilcox | G06Q 40/10 |
| | | | 705/36 T |

* cited by examiner

| Scenario | Husband Health | Wife Health | Asset A | Asset B | Utility Function |
|---|---|---|---|---|---|
| 1 | HH₁ | WH₁ | Asset A₁ | Asset B₁ | 0 |
| 2 | HH₂ | WH₂ | Asset A₂ | Asset B₂ | 1 |
| ⋮ | ⋮ | ⋮ | ⋮ | ⋮ | ⋮ |
| n | HHₙ | WHₙ | Asset Aₙ | Asset Bₙ | 0 |

SCENARIO EVALUATION AND PROJECTION USING MONTE CARLO SIMULATION AND MACHINE LEARNING

TECHNICAL FIELD

The present disclosure relates to scenario evaluation and related projections using Monte Carlo simulation and machine learning.

BACKGROUND

Monte Carlo simulation methods use repeated random sampling to obtain numerical results. Monte Carlo simulation methods use randomness to solve problems that might be deterministic. Monte Carlo methods can be used to solve problems having a probabilistic interpretation. There are many different types of Monte Carlo methods; however, in general such methods usually include the following steps: (1) define a domain of possible inputs, (2) generate inputs randomly from a probability distribution over the domain, (3) perform a deterministic computation on the inputs, and (4) aggregate the results of one or more deterministic computations on the inputs.

The aggregation of results of a Monte Carlo simulation method can be useful in evaluation of a great number of scenarios by providing an aggregate of results or consequences of the scenarios. However, Monte Carlo methods may fall short of providing ways of using the aggregates of results or consequences of the scenarios to project optimal or at least enhanced solutions according to the results or consequences.

Also, Monte Carlo methods provide approximations, which may be a problem in applications of Monte Carlo methods that are probing for more definite results. For example, it may be useful to use Monte Carlo simulation to evaluate a great number of scenarios to discover risks (such as physical safety risks or financial risks) amongst the scenarios. And, the discovered risks may be useful as input in determining solutions for avoidance of such risks. But, at times the output of a Monte Carlo simulation may not be precise enough and further processing may be needed.

Thus, technical problems persist in the use of Monte Carlo simulation methods for applications that are searching for more definite answers. For example, technical problems persist in the use of Monte Carlo simulation methods for applications searching for more definite answers to avoiding risks.

SUMMARY

Described herein are improved systems and methods for overcoming technical problems associated with the use of Monte Carlo simulation methods, such as problems associated with applications of Monte Carlo simulation methods that are searching for more definite answers. In some embodiments described herein, improved systems and methods overcome the technical problem of the results of Monte Carlo simulations providing approximations and/or non-optimal results (or at least non-enhanced results). Thus, such embodiments can provide more enhanced answers to limiting risks; and in some cases, such embodiments can even provide optimal answers to limiting risks.

In some embodiments, machine learning can be used to provide more enhanced answers to limiting risks; and in some cases, such embodiments can use machine learning to provide optimal answers to limiting risks discovered through Monte Carlo simulations. For example, in some embodiments of the systems and methods disclosed herein, the techniques can provide enhanced answers (or optimized answers) for limiting financial risks by repeatedly running Monte Carlo simulations over various scenarios related to risks (such as financial risks) for one or more individuals, and using the results of such simulations as input for machine learning repeatedly until enhanced answers (or optimized answers) for limiting risks are provided.

In summary, the systems and methods (or techniques) disclosed herein can provide specific technical solutions to at least overcome the technical problems mentioned in the background section and other parts of the application as well as other technical problems not described herein but recognized by those skilled in the art.

With respect to some embodiments, disclosed herein are computerized methods for scenario evaluation and related projections using Monte Carlo simulation and machine learning, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for a novel and improved scenario evaluation and related projections using Monte Carlo simulation and machine learning.

With respect to some embodiments, a system is provided that includes at least one computing device configured to provide useful and novel scenario evaluation and related projections using Monte Carlo simulation and machine learning. And, with respect to some embodiments, a method is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
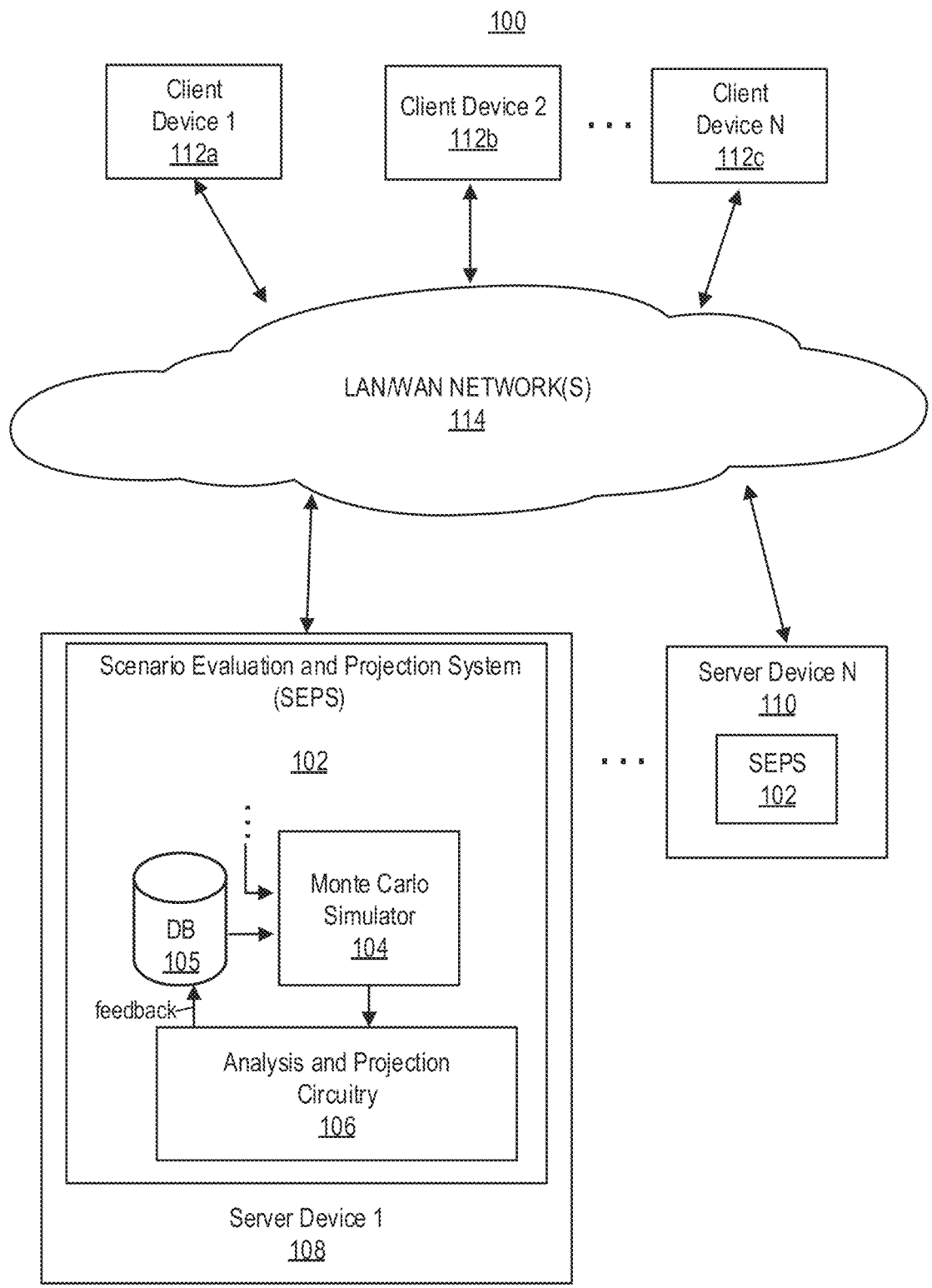
FIG. 1 illustrates an example network of computer systems to implement technologies for scenario evaluation and related projections using Monte Carlo simulation and machine learning, in accordance with some embodiments of the present disclosure.

Described herein are improved systems and methods for overcoming technical problems associated with the use of Monte Carlo simulation methods, such as problems associated with applications of Monte Carlo simulation methods that are searching for more definite answers. Such techniques can provide more enhanced answers for limiting risks; and in some cases, such embodiments can even provide optimal answers for limiting risks. Also, it is to be understood that the techniques disclosed herein can provide more enhanced answers or optimal answers for improving utility without reducing risks. And, the techniques disclosed herein can provide more enhanced answers or optimal answers for improving utility and reducing risks. For example, portfolios enhanced or optimized by the technologies described herein can maximize income and/or legacy without considering risk or with considering a selected level of risk.

In some embodiments, machine learning can be used to provide more enhanced answers for limiting risks; and in some cases, such embodiments can use machine learning to provide optimal answers for limiting risks discovered through Monte Carlo simulations. For example, in some embodiments of the systems and methods disclosed herein, the techniques can provide enhanced answers (or optimized answers) for limiting financial risks by repeatedly running Monte Carlo simulations over various scenarios related to financial risks for one or more individuals, and using the results of such simulations as input for machine learning repeatedly until enhanced answers (or optimized answers) for limiting financial risk are provided.

In some embodiments, the techniques can provide an enhanced or optimal household financial portfolio using investments and insurance. Enhanced or optimal portfolios can maximize income and/or legacy for a given level of risk or minimize risk for a given level of income and/or legacy. Risk can include a possibility of not meeting predetermined desired level of income or legacy. Using techniques described herein, Monte Carlo simulations can project portfolio variables and analyze outcomes. Monte Carlo simulation can run on a scenario set having thousands of individual scenarios. Each scenario can contain values that vary by scenario and are created, used, and aggregated.

Creating scenarios for a Monte Carlo simulation can be complex. In some embodiments, the projection scenarios can include both econometric and actuarial stochastic variables. There are many available economic scenario generators that can use expected returns, volatilities, and/or mean reversions as inputs and create correlated scenario sets. Any of the known existing economic scenario generators or foreseeable generators can be used to create scenarios and rates. Variables, such as actuarial variables can be created for the scenarios by sampling from the particular variable's distribution function and sampling from a Random Number Generator (RNG). The distribution functions (e.g., actuarial tables) can come from public or proprietary data. In some embodiments, the econometric and actuarial variables can be independent of each other and created separately. Or, the variables can be created using an integrated system that projects both types of variables. An individual scenario for some of the techniques described herein can include a value for each of stochastic econometric and actuarial variables.

In some embodiments, individual scenario outcomes can be viewed as pass or fail based on a set of failure conditions (e.g. level of income needed from portfolio, legacy value left to heirs, etc.) over a given time horizon. The time horizon can extend until the death of the last living member of a household (or beyond in some embodiments). In addition to pass or fail outcomes, a utility function can be applied to selected variable(s) to score outcomes. For example, a failure condition might be to leave less than one million dollars ($1 M) to heirs, and a scenario where a household leaves $3 M and $10 M both pass, but clearly the $10 M scenario is better.

A scenario set can contain thousands of individual scenarios. A problem overcome by the techniques disclosed herein is to project the portfolio and household members under a wide range of scenarios which creates a well-defined distribution of results to see how the portfolio responds under different conditions, as well as to understand how likely these outcomes are to occur. One way to analyze outcomes is to simply take the passing ratio of the individual scenarios' pass or fail outcomes. In addition, summary statistics like the variables' respective means, medians, and standard deviations can provide additional summary detail. The data generated from the individual scenarios can be used to generate a large pivot table or database, allowing for dissection and/or querying of the data according to the inputs of the user. Graphical representations, such as bar graphs, can also be used to group results and make patterns easier to visually detect.

To generate useful data output to derive the aforesaid graphical user interface elements, it is beneficial to leverage machine learning for forecasting and portfolio recommendations. Because each case is unique with its own financial statuses and age and/or health statuses of the household members, the solution will be unique as well. A financial product added to one household's portfolio might be beneficial while the same product added to another portfolio might be detrimental. The complex interaction between variables like portfolio deposits and withdrawals, portfolio earnings, and health-related life events (e.g. disability, long-term care needs, death, etc.) can make it extremely difficult to determine which portfolio modifications would be helpful and in what quantities. So, the system can make that determination on the fly based on the case's circumstances as input into machine learning processes.

In some embodiments, a starting point of the machine learning process is running a Monte Carlo simulation on a set of assets that can include includes financial securities such as stocks and bonds, insurance products such as life insurance and annuities, as well as include pensions, employment, etc. . . . . Assets can also include anything that causes or can cause a cash flow. The simulation can be executed on the set of assets as it exists today ($\Phi_0$) and scoring using a utility function $U(\Phi)$ can occur after the simulation. The utility function can be binary (e.g., pass or fail) or it can be a function of a variety of data including income generated and legacy available for heirs. The utility function can be evaluated on individual scenarios or on aggregate metrics across the scenario set. The utility function can be determined by the goals or needs of a household. Once today's portfolio ($\Phi_0$) has been scored, the system can make an educated guess ($\Phi_1$) on how the portfolio can be modified to create a better result. If, for example, $U(\Phi_1)$ is favorable to $U(\Phi_0)$, the portfolio changes from $\Phi_0$ to $\Phi_1$ are noted and influence the development of $\Phi_2$. For example, if $\Phi_1$ included the addition of a certain financial product, which was not included in $\Phi_0$, $\Phi_2$ might test a higher amount of the certain financial product to see if it helps more. Similarly, if $U(\Phi_1)$ is unfavorable to $U(\Phi_0)$, $\Phi_2$ and future iterations might be less likely to include the certain financial product in the portfolio. The process is repeated for successive $\Phi$ until the techniques reach a portfolio $\Phi_{enhanced}$ or $\Phi_{optimal}$ such that, for example, $U(\Phi_{enhanced}) \geq U(\Phi_n)$ for all n.

FIG. 1 illustrates an example network of computer systems 100 to implement technologies for scenario evaluation and related projections using Monte Carlo simulation and machine learning, in accordance with some embodiments of the present disclosure. The example network of computer systems 100 can implement any of the aforesaid components and operations as well as any component or operation described herein.

The network of computer systems 100 is shown including a scenario evaluation and projection system 102 (or SEPS 102). The SEPS 102 is shown including Monte Carlo simulator 104 and analysis and projection circuitry 106. As shown in FIG. 1, SEPS 102 can be hosted on one more server computers (e.g., see server devices 108 and 110). It is shown that the Monte Carlo simulator 104 provides output data to the analysis and projection circuitry 106, which the circuitry 106 uses as input. The Monte Carlo simulator 104 is shown receiving input data from multiple sources (e.g., database 105 and an additional source such as a database external to the SEPS 102). Also, as shown, feedback from the analysis and projection circuitry 106 can be provided to the sources of data that feed the Monte Carlo simulator 104. For example, FIG. 1 shows the circuitry 106 providing feedback to database 105. The feedback can be the output of analysis and projection circuitry 106, a derivative of the output, or intermediate data within a calculation of the circuitry 106.

The network of computer systems 100 is also shown including client devices that can receive data from SEPS 102 as well as communicate data to SEPS 102 (e.g., see client devices 112a, 112b, and 112c).

The network of computer systems 100 is also shown including one or more LAN/WAN networks 114 which are shown communicatively coupling the servers hosting SEPS 102 and the client devices. The LAN/WAN network(s) 114 can include one or more local area networks (LAN(s)) and/or one or more wide area networks (WAN(s)). The LAN/WAN network(s) 114 can include the Internet and/or any other type of interconnected communications network. The LAN/WAN network(s) 114 can also include a single computer network or a telecommunications network. More specifically, the LAN/WAN network(s) 114 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

At least each shown component of the network of computer systems 100 can be or include a computer system which can include memory that can include media. The media can include or be volatile memory components, non-volatile memory components, or a combination of such. In some embodiments, the memory is a storage system. An example of a storage system is a SSD. In some embodiments, the memory is a hybrid memory/storage sub-system. In general, each of the computer systems can include a host system that uses the memory. For example, the host system can write data to the memory and read data from the memory.

The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

A memory system controller (hereinafter referred to as "controller") can communicate with the memory components to perform operations such as reading data, writing data, or erasing data at the memory components and other such operations. The controller can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or other suitable processors. The controller can include a processor (processing device) configured to execute instructions stored in local memory. The local memory of the controller can include an embedded memory configured to store instructions for performing various processes, operations, logic flows, and routines that control operation of the memory, including handling communications between the memory and the host system. In general, the controller can receive commands or operations from the host system and can convert the commands or operations into instructions or appropriate commands to achieve the predetermined desired access to the memory components.

The memory can also include additional circuitry or components. In some embodiments, the memory can include a cache or buffer (e.g., DRAM) and address circuitry (e.g., a row decoder and a column decoder) that can receive an address from the controller and decode the address to access the memory components.

In some aspects of the present disclosure, the memory includes the SEPS 102. In some embodiments, the controller includes at least a portion of the SEPS 102. For example, the controller can include a processor (processing device) configured to execute instructions stored in local memory for performing the operations described herein such as the operations described herein associated with the SEPS 102. In some embodiments, the SEPS 102 is part of the host system, an application, or an operating system.

The SEPS 102 can use the memory, the memory components, and the host system to implement technologies for scenario evaluation and related projections using Monte Carlo simulation and machine learning.

Further details with regards to the operations of the SEPS 102 are described below. As shown in FIG. 1, the network of computer systems 100 can include the SEPS 102.

In some embodiments, the Monte Carlo simulator 104 can be configured to run a Monte Carlo simulation on a first set of assets for reducing risk ($\Phi_0$). The running of the Monte Carlo simulation can include receiving and using, as input, a set of scenarios. Each scenario of the set of scenarios can include stochastic variables that vary per scenario, and each scenario of the set of scenarios can include a randomly generated value for each stochastic variable.

In some embodiments, the analysis and projection circuitry 106 can be configured to analyze output of the Monte Carlo simulation. The analyzing of the output of the Monte Carlo simulation can include determining, for each scenario of the set of scenarios, a plurality of scenario outcomes based on a set of failure conditions over a time period. And, each outcome of the plurality of scenario outcomes can be a binary outcome of either pass or fail (e.g., binary value 1 or 0). In some embodiments, the analyzing of the output of the Monte Carlo simulation includes determining a passing rate according to the pluralities of scenario outcomes for the set of scenarios.

In such embodiments, the analysis and projection circuitry 106 can also be configured to score the analyzed output of the Monte Carlo simulation on the first set of products ($\Phi_0$) according to a utility function U($\Phi_0$). Also, the circuitry 106 can be configured to make an educated guess for a second set of assets ($\Phi_1$) for reducing risk better than the first set of assets ($\Phi_0$). The analysis and projection circuitry 106 can also direct and control the repeating of the running of the Monte Carlo simulation, the analysis of the output of the simulation, and the scoring of the analyzed output for the second set of assets ($\Phi_1$).

In such embodiments, the analysis and projection circuitry 106 can also be configured to compare the score for the first set of assets ($\Phi_0$) against the score for the second set of assets ($\Phi_1$). And, when the second set of assets ($\Phi_1$) results in a higher utility score than the first set of assets ($\Phi_0$) (such as by reducing likelihood of failure or creating more expected income), the circuitry 106 can be configured to use the second set of assets ($\Phi_1$) to make an educated guess for a third set of assets ($\Phi_2$). Otherwise, the circuitry 106 can be configured to use the first set of assets ($\Phi_0$) to make an educated guess for the third set of assets ($\Phi_2$). Also, in some embodiments, the lesser set of the sets at reducing risk can be used in the determination of the third set of assets in addition to the use of the better set of the sets.

In such embodiments, the aforementioned operations performable by the Monte Carlo simulator 104 or the analysis and projection circuitry 106 can be repeated for one or more successive sets of assets until reaching an enhanced set of assets ($\Phi_{enhanced}$) which is better at reducing risk than any other set of assets simulated, analyzed and scored (e.g., better at reducing risk than any other set of financial assets simulated, analyzed and scored for an individual or a household). The enhanced set of assets ($\Phi_{enhanced}$) can be scored by a utility function U($\Phi_{enhanced}$) on the enhanced set of assets. In some embodiments, the aforementioned operations performable by the Monte Carlo simulator 104 or the analysis and projection circuitry 106 can be repeated for one or more successive sets of assets until reaching an optimized set of assets ($\Phi_{optimized}$), which is optimal at reducing risk over all other sets of related assets (e.g., optimal over all sets of assets simulated, analyzed and scored for an individual or a household).

In some embodiments, the set of assets for reducing risk can include a household financial portfolio having investments and insurance. And, the utility can be based on the probability of not meeting a predefined level of income or assets within a certain period of time.

In such embodiments, the variables for each scenario of the set of scenarios can include econometric stochastic variables and actuarial stochastic variables. Also, a value for an actuarial stochastic variable for a scenario of the set of scenarios can be created by sampling from a distribution function of the actuarial stochastic variable according to a RNG. And, a value for an econometric stochastic variable for a scenario of the set of scenarios can be created by sampling from a distribution function of the econometric stochastic variable according to a RNG. Also, in such embodiments, the determining the plurality of scenario outcomes can be based on the set of failure conditions over a time horizon.

In some embodiments, the analysis and projection circuitry 106 can also be configured to prioritize the failure conditions by applying a utility function to the failure conditions to score outcomes. In such embodiments, the utility function for prioritizing the failure conditions can include a variable associated with spending. Also, the utility function for prioritizing the failure conditions can include a variable associated with a minimum liquidity requirement, a variable associated with a time horizon, a variable associated with an ending value, or any combination thereof.

In such embodiments, the output of the utility function can be a binary value of either pass or fail status for a scenario, and the utility function can output a pass when a set of assets meets its spending goals while maintaining a minimum value over the time horizon and has at least the predetermined desired amount at the end of the projection.

Alternatively, the output of the utility function can show a degree of passing or failing. The degree of passing or failing can include total income generated, income shortfall relative to a minimum spending benchmark, a final value shortfall to a final value benchmark, any derivative thereof, or any combination thereof. In such embodiments, the analysis and projection circuitry 106 can be configured to group the set of scenarios into subsets of scenarios defined by ranges of a selected variable. For example, the analysis and projection circuitry 106 can be configured to group the set of scenarios into subsets of scenarios by ranges of lifespan.

Figure 2A:
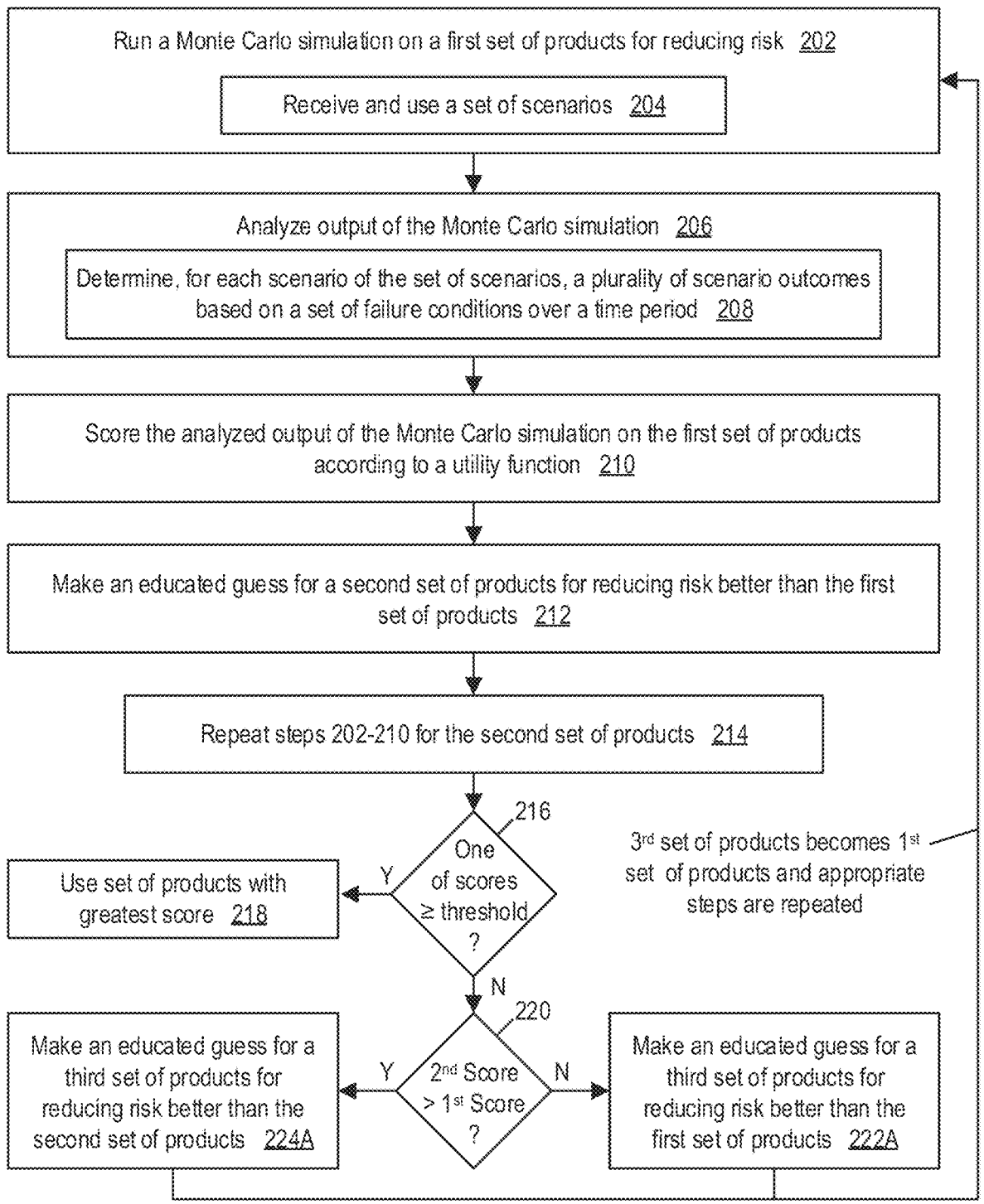
FIGS. 2A and 2B are flow diagrams of example methods for implementing scenario evaluation and related projections using Monte Carlo simulation and machine learning, in accordance with some embodiments of the present disclosure.
Figure 2B:
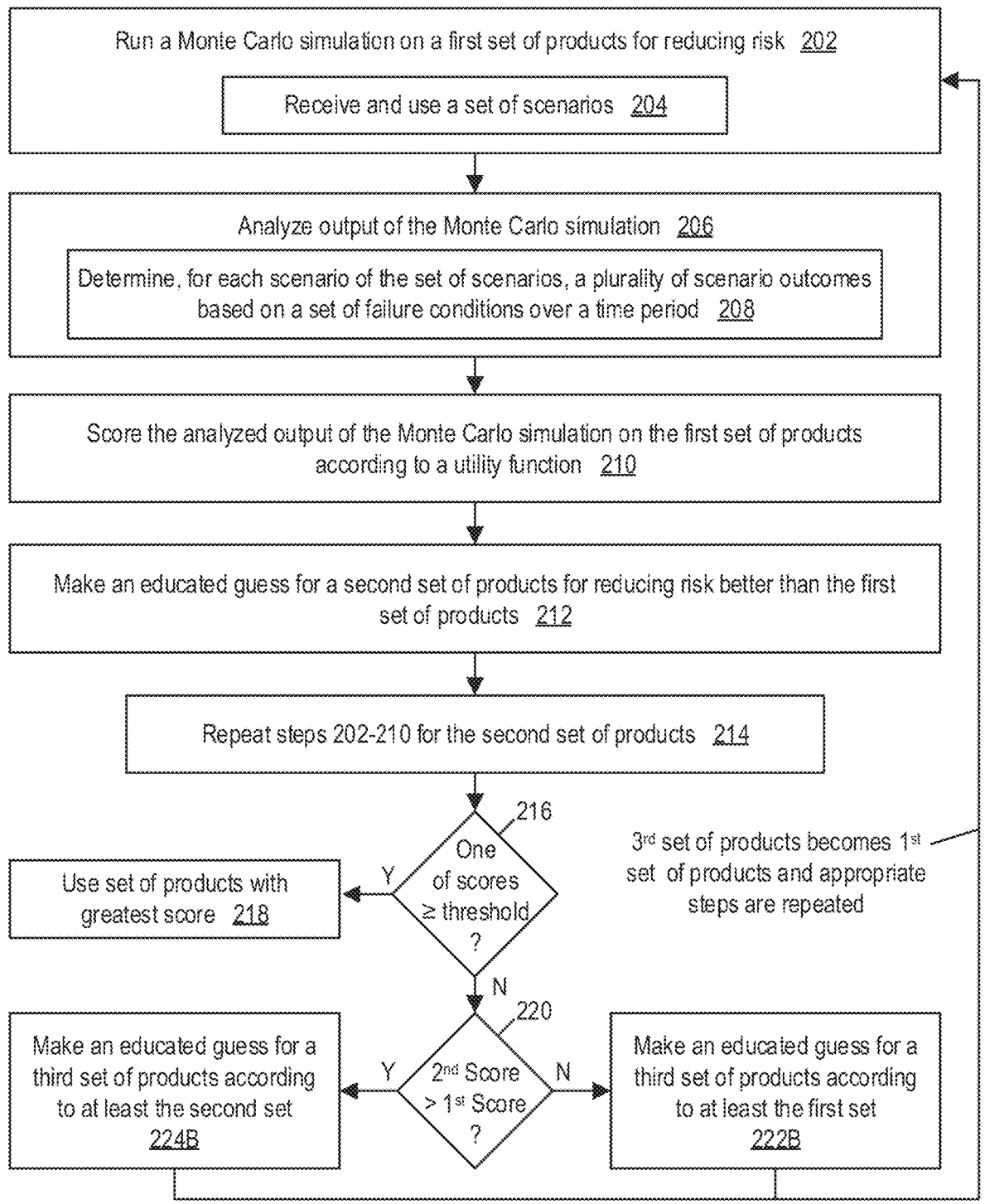
Figure 3:
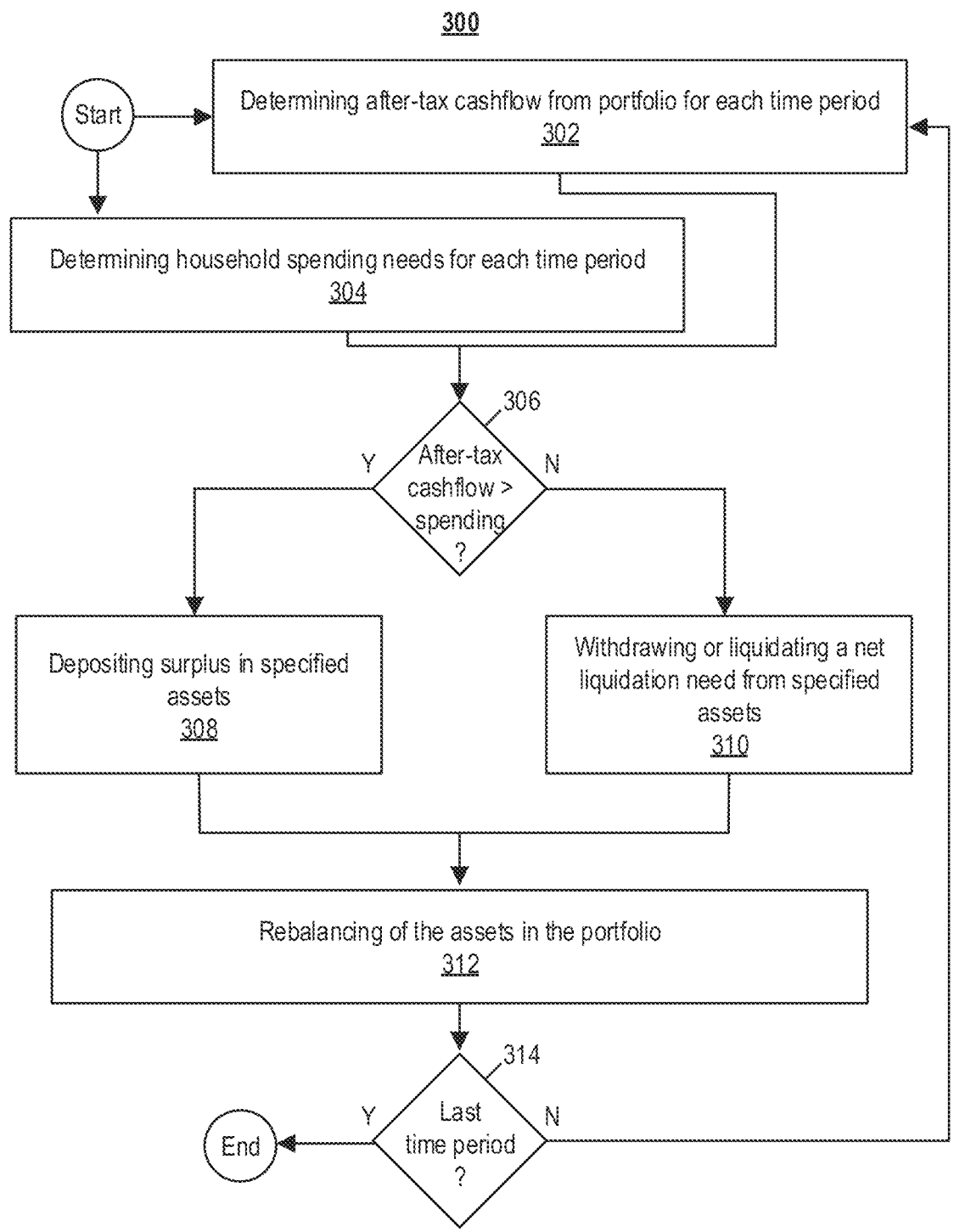
FIG. 3 is a flow diagram of an example method for projecting the household and financial data forward until a specified time horizon, in accordance with some embodiments of the present disclosure.

FIGS. 2A, 2B, and 3 are flow diagrams of example methods that can be implemented by parts of the network of computer systems 100, in accordance with some embodiments of the present disclosure. The methods 200A, 200B, and 300, in FIGS. 2A, 2B, and 3, can each be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods and sub-methods can be performed by one or more aspects of the SEPS 102. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 2A is a flow diagram of an example method 200A for implementing scenario evaluation and related projections using Monte Carlo simulation and machine learning, in accordance with some embodiments of the present disclosure.

At block 202, the method 200A includes running (such as by the Monte Carlo simulator 104) a Monte Carlo simulation on a first set of assets ($\Phi_0$) for reducing risk. The running of the Monte Carlo simulation can include receiving and using, as input, a set of scenarios (as shown at block 204). Each scenario of the set of scenarios can include stochastic variables that vary per scenario, and each scenario of the set of scenarios can include a randomly generated value for each stochastic variable. In some embodiments, the determining the plurality of scenario outcomes is based on the set of failure conditions over a time horizon.

In some embodiments, the set of assets can include a household portfolio having investments and insurance, and the risk limited by the assets can relate to a probability of not meeting a predefined level of income or assets within a certain period of time. In such embodiments, the variables for each scenario of the set of scenarios can include econometric stochastic variables and actuarial stochastic variables. Also, a value for an actuarial stochastic variable for a scenario of the set of scenarios can be created by sampling from a distribution function of the actuarial stochastic variable according to a RNG. And, a value for an econometric stochastic variable for a scenario of the set of scenarios can be created by sampling from a distribution function of the econometric stochastic variable according to a RNG.

In some embodiments, input for running (such as by the Monte Carlo simulator 104) a Monte Carlo simulation on a first set of products can include household inputs and scenario inputs. Household inputs can include information on members of a household associated with the set of products. Information on members can include Name/ID, age, sex, and current health status. Health status can be used to map to appropriate actuarial tables. Household inputs can also include spending assumptions. Spending assumptions can include a vector or array of spending requirements for the time periods of the projection. The values of the array can be fixed, indexed with inflation, they can include special expenses (e.g. college tuition for children), and/or calculated based on the circumstances of a particular scenario. If the spending assumptions are not fixed, there can be another array of minimum spending requirements to use as a floor during the simulation.

Household inputs can also include assets of the household. Assets can include anything that has a market value or cash value or liquidation value and/or has a cashflow. Assets can include stocks, bonds, annuities, life insurance policies, pensions, incomes from jobs or other sources, and real property, just to name a handful. Anything with a liquidation value or a cashflow can be modeled by the system as an asset. In embodiments using object-oriented programming or design, there can be a base class called "Asset", and the definitions of all assets in the system are derived from the Asset class. The system can offer predetermined assets that can be included in the simulation or new types of assets can be created for simulations. The household portfolio can be a collection of assets and sub-portfolios. It is to be understood for the sake of this disclosure that a household portfolio could be for one or more individuals of a household.

Household inputs can also include inputs specific to a household portfolio. In some embodiments, a household portfolio is a collection of assets and sub-portfolios (e.g., a top-level portfolio). In such examples, the household portfolio (and potentially lower-level portfolios) has tax treatment processing information for the household (e.g. income tax rates, capital gains rates, etc.). Also, the portfolio can act as a top-level portfolio in that it can include sub-portfolios and assets. The sub-portfolios and assets can override the generalized treatment of higher or lower-level portfolios.

Scenario inputs can include inputs for many different variables that can vary with each scenario. The scenario inputs can include financial variables (e.g. asset returns, interest rates, etc.) derived stochastically along with the stochastic projection of actuarial variables (e.g. life events). Asset returns can relate to assets that have cash values that can have an associated return on that value. An asset can have a fixed vector of returns that does not vary by scenario. But many assets (stocks, bonds, etc.) can have market returns that vary by scenario. Data associated with assets can have a unique vector of returns for each scenario, and such data can be applied during the simulation of that scenario. With respect to interest rates, some embodiments can include a scenario having a two-dimension matrix of interest rates. For example, for each time period (D1) of the scenario there can be an interest rate curve defined by multiple durations of the curve (D2). The interest rate matrix can be reduced down to as little as one scalar rate that applies to all durations in all scenarios by filling out the two-dimension matrix with one rate. Household member life events can also be included in scenario inputs. Each household member will have an age of death for the scenario determined by random sampling from the person's relevant mortality table or distribution. In addition, other major health events like disability, long-term care, etc. can be introduced based on random sampling from the relevant incidence table or distribution.

At block 206, the method 200A continues with analyzing (such as by the analysis and projection circuitry 106) output of the Monte Carlo simulation. The analyzing of the output of the Monte Carlo simulation can include determining, for each scenario of the set of scenarios, a plurality of scenario outcomes based on a set of failure conditions over a time period (such as shown at block 208). Each outcome of the plurality of scenario outcomes can be a binary outcome of either pass or fail (e.g., binary "1" or "0"). In some embodiments, the analyzing of the output of the Monte Carlo simulation can include determining a passing rate according to the pluralities of scenario outcomes for the set of scenarios.

Also, in some embodiments, the method can include prioritizing the failure conditions by applying a utility function to the failure conditions to score outcomes. The utility function for prioritizing the failure conditions can included a variable associated with spending, a variable associated with a minimum liquidity requirement, a variable associated with a time horizon, a variable associated with an ending value, or a combination thereof. In such embodiments, the output of the utility function can be a binary value of either pass or fail status for a scenario, and the utility function can output a pass when a set of products meets its spending goals while maintaining a minimum value over the time horizon and has at least the predetermined desired amount at the end of the projection. Alternatively, the output of the utility function can show a degree of passing or failing. The degree of passing or failing can include a total income generated, an income shortfall relative to a minimum spending benchmark, a final value shortfall to a final value benchmark, any derivative thereof, or any combination thereof.

In some embodiments, the method can include grouping the set of scenarios into subsets of scenarios defined by ranges of a selected variable. And, in some examples the grouping can include grouping the set of scenarios into subsets of scenarios by ranges of lifespan.

In some embodiments, the method (such as via SEPS 102) can include projecting the household and financial data forward until a specified time horizon which can be up until the final death of an individual in the household or the final death of the household overall (e.g., see method 300 depicted in FIG. 3). Each scenario projection creates a large amount of data that is stored in a database for later analysis. Variables that vary over time have their values and/or cashflows stored in vectors with a length equal to the number of time periods of the scenario. In some embodiments, the scenario portfolio projection can include, for each time period (t), determining after-tax cashflow from the portfolio (e.g., see block 302 depicted in FIG. 3). The cashflow can be derived from stock dividends, bond coupon payments, pension income, and/or employment paychecks, among many other sources. The scenario portfolio projection can also include, for each time period (t), determining household spending needs (e.g., see block 304). The spending can be fixed, indexed with inflation, reflect health status of household members (e.g. if a member is dead, less expenses needed to cover), can include special expenses (e.g. college tuition), and can be a function of the value of the portfolio and the ages of the household members. The scenario portfolio projection can also include, for each time period (t), determining if the after-tax cashflow is greater than the household spending needs (e.g., see block 306). If it is greater, then there is a net surplus, and the surplus is deposited in specified assets (e.g., see block 308). If the after-tax cashflow is less than the household spending needs, there is a net liquidation need, and the need is withdrawn and/or liquidated from the specified assets (e.g., see block 310). The scenario portfolio projection can also include, after the deposit and/or withdrawal, rebalancing of the assets in the portfolio (e.g., see block 312). The rebalancing can include applying asset returns for the period. The rebalancing can reestablish the amount of each asset to its specified portfolio weight. Returns from the portfolio can then be applied from period (t) to (t+1). For example, Asset_Value (t+1)=Asset_Value(t)*(1+Return(t)). The scenario portfolio projection can loop and repeat process for (t+1) until the end of the scenario is reached. For example, as shown in method 300 at block 314, the end of a scenario is reached after processing the scenario for the last time period. At block 314, the method 300 can include determining whether the scenario is at its last time period. If it is at its last time period then the method 300 can end. Otherwise, the method 300 can loop back to block 302, and can repeat operations 302-314.

At block 210, the method 200A continues with scoring (such as by circuitry 106) the analyzed output of the Monte Carlo simulation on the first set of assets ($\Phi_0$) according a utility function U($\Phi_0$).

At block 212, the method 200A continues with making (such as by circuitry 106) an educated guess for a second set of assets ($\Phi_1$) for reducing risk better than the first set of assets ($\Phi_0$). In other words, at block 212, the method 200A continues with determining a second set of assets for reducing risk better than the first set of assets based on historical data.

At block 214, the method 200A continues with repeating operations at blocks 202, 204, 206, and 210 for the second set of assets.

At block 216, the method 200A continues with determining whether one of the scores exceeds or is equal to a threshold value. The threshold value can be set in advance of the method or it can be set dynamically based on feedback provided by the method. The threshold value can be related to the highest utility of the asset sets tested, and the method can be completed when the system cannot determine a set of assets with higher utility. If one of the scores exceeds or is equal to a threshold value, then the method 200A can continue with using or recommending the set of assets with the greatest score that is exceeding or equal to the threshold value (at block 218). Otherwise, at block 220, the method can continue with determining whether the second score from scoring the analyzed output of the Monte Carlo simulation on the second set of assets ($\Phi_1$) according to a utility function U($\Phi_1$) exceeds the first score from scoring the analyzed output of the Monte Carlo simulation on the first set of assets ($\Phi_0$) according to a utility function U($\Phi_0$).

For example, at block 220, the method 200A continues with comparing (such as by circuitry 106) the score for the first set of assets ($\Phi_0$) against the score for the second set of assets ($\Phi_1$). And, at block 222A, when the first set of assets ($\Phi_0$) is better at reducing risk than the second set of assets OA the first set of assets ($\Phi_0$) are used to make an educated guess for a third set of assets ($\Phi_2$). In other words, when the first set of assets is better at reducing risk than the second set of assets according to the comparison, use the first set of assets to determine a third set of assets for reducing risk better than the first set of assets based on historical data. And, at block 224A, when the second set of assets ($\Phi_1$) is better at reducing risk than the first set of assets ($\Phi_0$), the second set of assets ($\Phi_1$) are used to make an educated guess for a third set of assets ($\Phi_2$). In other words, when the second set of assets is better at reducing risk than the first set of assets according to the comparison, use the second set of assets to determine a third set of assets for reducing risk better than the second set of assets based on historical data. Also, in some embodiments, the lesser set of the sets at reducing risk can be used in the determination of the third set of assets in addition to the use of the better set of the sets.

As shown in FIG. 2A, the third set of assets essentially becomes the first set of assets and the aforesaid operations of method 200A are repeated. For example, the method 200A continues with repeating the appropriate operations for a successive set of assets until reaching an enhanced set of assets ($\Phi_{enhanced}$) such that U($\Phi_{enhanced}$) is better at reducing risk than any other set of assets simulated, analyzed and scored by the method. For example, the method 200A continues with repeating the operations 202, 204, 206, 208, 210, 212, 214, 216, 218, 220, 222A, and 224A, when appropriate, for successive sets of assets until reaching an enhanced set of assets where the scoring for the enhanced set of assets according to the utility function is better than the scoring on any other set of assets.

FIG. 2B is another flow diagram of an example method 200B for implementing scenario evaluation and related projections using Monte Carlo simulation and machine learning, in accordance with some embodiments of the present disclosure. Method 200B includes the operations of blocks 202-220, which is similar to method 200A. However, method 200B differs from method 200A at blocks 222B and 224B. At block 222B, when the first set of assets ($\Phi_0$) is better at reducing risk than the second set of assets ($\Phi_1$), one or more assets of the first set of assets ($\Phi_0$) are used to a greater extent than assets of the second set of assets ($\Phi_1$) to make an educated guess for a third set of assets ($\Phi_2$). In some examples, when the first set of assets is better at reducing risk than the second set of assets according to the comparison, the first set of assets can be used to a greater degree than the second set of assets to determine a third set of assets. And, at block 224B, when the second set of assets ($\Phi_1$) is better at reducing risk than the first set of assets ($\Phi_0$), one or more assets of the second set of assets ($\Phi_1$) are used to a greater extent than assets of the first set of assets ($\Phi_0$) to make an educated guess for a third set of assets ($\Phi_2$). In other words, when the second set of assets is better at reducing risk than the first set of assets according to the comparison, the second set of assets can be used to a greater degree than the first set of assets to determine a third set of assets.

In some embodiments, when the first set of assets is better at reducing risk than the second set of assets, portfolio modifications based on the first set of assets to the second set of assets can increase risk. The third set of assets can be constructed making the opposite modifications to the first set of assets. For example, if the second asset set added more of a particular asset than was in the first asset set, and the first asset set was better at reducing risk, then the third asset set can be constructed to have less of the particular asset than the first asset set. And, vice versa. When the second set of assets is better at reducing risk than the first set of assets, the third set of assets can be constructed making similar changes as those made from a first asset set to a second asset set except to a higher degree. For example, if the first asset set added more of a particular asset than was in the second asset set, and the second asset set was better at reducing risk, then the third asset set can be constructed to have more of the particular asset than the first asset set.

Some embodiments can include a method having the following operations (a) through (g).

(a) Running a Monte Carlo simulation on a first set of assets for reducing risk, the running of the Monte Carlo simulation including receiving and using, as input, a set of scenarios, each scenario of the set of scenarios including stochastic variables that vary per scenario, and each scenario of the set of scenarios including a randomly generated value for each stochastic variable.

(b) Analyzing output of the Monte Carlo simulation, the analyzing of the output of the Monte Carlo simulation including determining, for each scenario of the set of scenarios, a plurality of scenario outcomes based on a set of failure conditions over a time period, each outcome of the plurality of scenario outcomes being a binary outcome of either pass or fail.

(c) Scoring the analyzed output of the Monte Carlo simulation on the first set of assets according to a utility function.

(d) Determining a second set of assets for reducing risk better than the first set of assets based on historical data.

(e) Repeating operations (a), (b), and (c) for the second set of assets.

(f) Comparing the score for the first set of assets against the score for the second set of assets, and when the second set of assets is better at reducing risk than the first set of assets according to the comparison, use the second set of assets to determine a third set of assets for reducing risk better than the second set of assets based on historical data, and when the first set of assets is better at reducing risk than the second set of assets according to the comparison, use the first set of assets to determine a third set of assets for reducing risk better than the first set of assets based on historical data. Also, in some embodiments, the lesser set of the sets at reducing risk can be used in the determination of the third set of assets in addition to the use of the better set of the sets.

(g) Repeating operations (a), (b), (c), (d), (e), and (f) for successive sets of assets until reaching an enhanced set of assets where the scoring for the enhanced set of assets according to the utility function is better than the scoring on any other permissible set of assets.

Some embodiments can include a system, having a computing device, having a processor and a non-transitory computer-readable storage medium for tangibly storing thereon computer program code for execution by the processor, the computer program code having the following logic (a) through (g).

Executable logic (a) for running a Monte Carlo simulation on a first set of assets for reducing risk, the running of the Monte Carlo simulation including receiving and using, as input, a set of scenarios, each scenario of the set of scenarios including stochastic variables that vary per scenario, and each scenario of the set of scenarios including a randomly generated value for each stochastic variable;

Executable logic (b) for analyzing output of the Monte Carlo simulation, the analyzing of the output of the Monte Carlo simulation including determining, for each scenario of the set of scenarios, a plurality of scenario outcomes based on a set of failure conditions over a time period, each outcome of the plurality of scenario outcomes being a binary outcome of either pass or fail.

Executable logic (c) for scoring the analyzed output of the Monte Carlo simulation on the first set of assets according to a utility function.

Executable logic (d) for determining a second set of assets for reducing risk better than the first set of assets based on historical data.

Executable logic (e) for repeating operations performed by the logic (a), (b), and (c) for the second set of assets.

Executable logic (f) for comparing the score for the first set of assets against the score for the second set of assets, and when the second set of assets is better at reducing risk than the first set of assets according to the comparison, the system uses the second set of assets to determine a third set of assets for reducing risk better than the second set of assets based on historical data, and when the first set of assets is better at reducing risk than the second set of assets according to the comparison, the system uses the first set of assets to determine a third set of assets for reducing risk better than the first set of assets based on historical data. Also, in some embodiments, the lesser set of the sets at reducing risk can be used in the determination of the third set of assets in addition to the use of the better set of the sets.

Executable logic (g) for repeating operations performed by the logic (a), (b), (c), (d), (e), and (f) for successive sets of assets until reaching an enhanced set of assets where the scoring for the enhanced set of assets according to the utility function is better than the scoring on any other set of assets.

In some embodiments, a set of assets can include a financial portfolio for an individual or a household. Such examples can use Monte Carlo simulation on household portfolios where the mortality and morbidity of the household members are stochastic variables. This is in addition to stochastic financial variables. And, the impact of mortality and morbidity can be reflected in the needs and cashflows of an individual or household. For example, a scenario where one or more household members are deceased could result in reduced spending needs, or a scenario where one or more household members are in long term care could result in higher spending needs. The techniques can also model non-traditional assets like pensions, social security, life and disability insurance, annuities, inheritances, and employment, which have contingent cashflows based on the health status of one or more individuals. The model used by the techniques can include stochastically projecting actuarial and econometric variables together and measuring the impacts, including those on non-traditional assets and insurance products, for the purposes of analyzing household or individual portfolios.

When running the Monte Carlo simulation on the scenarios, a large amount of data can be created for each scenario. With the financial portfolio example, there are an abundance of asset values, returns, and cashflows (such to name a few variables) at a multitude of time periods of the projection as well as the health statuses of the one or more household members. Such variables can be utilized through matrixes or arrays of values. In some embodiments, a utility function can then be applied to such data to determine how effective a set of assets can be. The utility function can be user-defined and can take many different forms based on the specifications of the user. However, the following generalized form can be appropriate for a great number of owners of a set of assets (e.g., households). $\text{Utility}_{scenario} = U(S, V_{min}, T, V_{end})$.

S represents a spending function. The spending function can be defined by a fixed amount, indexed with inflation, or a function of variables such as portfolio value (e.g. the more money one has, the more money that person can spend), health status of household members (e.g. if a member is dead, less spending is needed by the household; if a member needs long term care, household expenses are increased by that amount; etc.). The spending function can also be a user-defined schedule allowing for a plurality of possible spending patterns. The utility function can favor asset sets that meet the spending requirements of the household, and it can favor asset sets that allow for increased spending (provided that does not detrimentally impact the other components of the utility function). The utility function can disfavor asset sets that do not support the desired spending function.

$V_{min}$ represents a minimum value requirement (e.g., liquidity). $V_{min}$ can be a fixed amount, indexed with inflation, or it can be a function of the scenario data (e.g. the older the household, the shorter the duration the portfolio needs to support the remainder of the members' lives, so $V_{min}$ decreases throughout the projection). $V_{min}$ can also be a user-defined schedule allowing for a plurality of possible patterns. The utility function can favor asset sets that allow the portfolio to meet the minimum value requirements throughout the projection.

T represents time horizon. Time horizon can be a fixed time horizon (e.g. 30 years), or it can be contingent on the household members' lifespans (e.g. projection ends at last death of household).

$V_{end}$ represents an ending value. $V_{end}$ can be fixed a fixed amount, indexed with inflation (e.g. a portfolio value as of a retirement year; a legacy value to be transferred to heirs) or it can be a function of the scenario data (e.g. leave $1 M to each of living children). $V_{end}$ can also be a user-defined schedule allowing for a plurality of possible patterns or all possible patterns. The utility function can favor asset sets that meet or exceed the desired ending value of the portfolio.

A utility function used by the techniques can provide a binary output or more complex outputs. A binary form can simply be a pass or fail status of the scenario. For example, if a portfolio meets its spending goals while maintaining at least a minimum value over the time horizon and has at least the predetermined desired amount at the end of the projection, the scenario passes (e.g., scored a "1"). If it does not meet its condition, it fails (e.g., scored a "0").

In some embodiments, the utility function can be a function of components of the scenario data, which can show relative value for scenarios that pass or fail. For example, total income generated by the portfolio, income shortfall relative to a minimum spending benchmark, final value shortfall to a final value benchmark, a derivative thereof, or a combination thereof can be used by the utility function.

In-depth analysis of individual scenarios by the system can be useful, such as if the user is interested in seeing exactly how and why the asset set yielded a particular outcome. Another benefit of the system is analyzing how the asset set performed across a set of scenarios, usually numbering in the thousands. One of the example purposes of the system is to build an asset set that can withstand events that are out of a household's control, such as market crashes, early and unexpected death, and extended retirements with high health care costs. These types of uncontrollable circumstances can have catastrophic effects on an unprepared household portfolio. It is also very difficult to balance risks, as mitigating one risk often leaves a portfolio more exposed to another risk. The system can be used to construct asset sets that create positive correlations between the needs of the household and the returns of the portfolio under a variety of circumstances.

Scenario sets and their outcomes can be analyzed in many different ways. The sets can be viewed graphically, where the utility functions (or variables) of the individual scenarios are sorted and plotted. This gives the user a quick and intuitive understanding on the range and relative likelihood of potential outcomes. Another way to analyze scenario sets is to compute summary statistics. These include the mean, median, and standard deviations of the scenario utility functions or scenario variables, and the statistics also can be customizable to user-defined parameters.

In some embodiments, the portfolio recommendation process can define a utility function for a scenario set. This can take many different forms. One simple form is to set the utility function equal to the mean of the individual scenarios' utility functions. If the individual scenarios use a binary pass or fail utility function, then the scenario set utility function is equal to the passing ratio or rate of the individual scenarios of the set. In such examples, if a Monte Carlo simulation is run on two portfolios, using the same individual scenarios, the portfolio with the higher passing ratio or rate across the scenario set would be deemed superior.

In some embodiments where the set of products is a portfolio for a household, the portfolio can include various assets, such as stocks, bonds, employment, pensions, social security, and insurance products. The portfolio can be run through a Monte Carlo simulation as it exists presently. Using a passing ratio as the utility function metric, the passing ratio of a present portfolio is recorded. Next, the system can make an educated guess on a portfolio modification that could increase the passing ratio while keeping the income the same. The potential modification can be run through the same scenario set and its passing ratio is noted. If the passing ratio is greater than the present portfolio, the impact of the modification is noted and a new educated guess is generated, speculating to further increase the passing ratio on the next iteration. If the passing ratio decreases, the impact of the modification is also noted, and a new educated guess is generated, likely in the opposite direction of what would have been suggested if the passing rate had increased.

In some embodiments, the system can be used to test the impact of adding and/or removing financial products, as well as be used to assist in decision making. For example, understanding the implications of retiring at 65 vs. 68 years if age, or deciding whether to take a lump sum payment option versus a lifetime monthly pension. In such examples the system considers the unique financial and/or life circumstances of the individual, other household members, and the complicated interaction between the needs and wants of the household and the diverse portfolio.

Outputs as well as inputs of the aforesaid processes (e.g., processes discussed with respect to FIGS. 1-3) can be stored in and managed through databases (e.g., database 105 depicted in FIG. 1). For example, outputs from the depicted methods and systems (e.g., system 102 and methods 200A and 200B) can be stored in and managed through one or more databases of information. Each scenario of a scenario set can be a record in the database. Each record can include a set of vectors that correspond to the values, cashflows, and other defining information about the assets contained within a set of assets such as a portfolio for a household. The information can be updated throughout the simulation and projections. The information can also have vectors include health status of the household members at each period throughout a projection. Each record can contain a scalar utility function value.

Figures 4, 5:
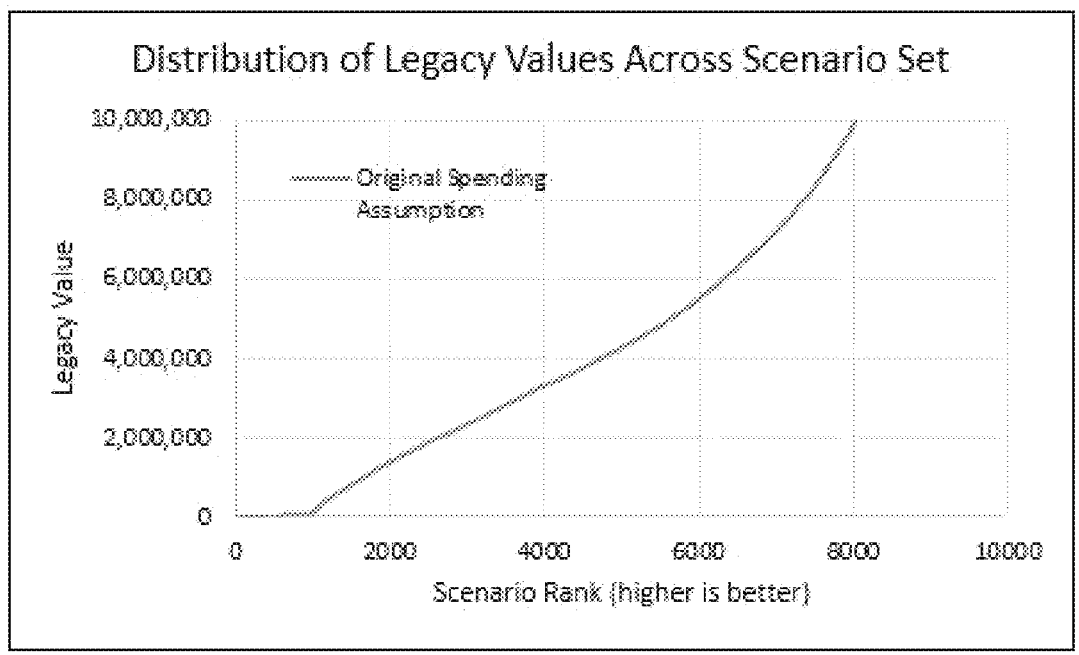
FIG. 4 illustrates an example of output information from a database that can be used by a Monte Carlo simulation, in accordance with some embodiments of the present disclosure.
FIGS. 5 and 6 illustrate example sorted plots of variables of a set of scenarios, in accordance with some embodiments of the present disclosure.

FIG. 4 illustrates an example of output information from a database (e.g., database 105 depicted in FIG. 1) that can be used by a Monte Carlo simulation, in accordance with some embodiments of the present disclosure. The output information includes a table with multiple scenarios of a scenario set. The rows represent records for each scenario of the set. In the table, $HH_1$ is a vector that has t elements, where t is the number of time periods in scenario 1. $HH_1$ is for a husband in a household. Values can include "Healthy", "Disabled", "Long-term Care", "Dead", etc. $WH_1$ is similar to $HH_1$ but for a wife in the household. Asset $A_1$ is an array of data type asset and represents a first asset. An asset can include internal variables and methods that define the behavior and/or performance of the asset over the time periods of scenario 1. Variables can include cashflow, which can be a vector of length t containing the cashflows of the asset at each time period of the projection. There can be similar vectors for market value, death benefit, allocation ratio, etc. depending on the given asset. Asset $B_1$ is similar to Asset $A_1$ but for it represents a second asset instead of the first asset. A utility function, illustrated in the table, has an output of a value of 1 if the portfolio does not meet failure conditions over the course of the scenario projection and 0 if it does. The portfolio fails scenario 1 and scenario n and passes scenario 2. Scenario records do not need to include utility function values, and the values can be a function of one or more variables in the projection. In some embodiments, the outputs of the utility function can be more complex than pass or fail.

FIG. 5 illustrates an example sorted plot of a variable of a set of scenarios, in accordance with some embodiments of the present disclosure. The sorted plot depicted in FIG. 5 can be outputted from a device running method 200A or 200B (e.g., one or more devices running the SEPS 102). Sorting the outcomes of a variable or utility function across the scenario set and viewing graphically gives an intuitive view of the range of potential outcomes and relative likelihood of the outcomes occurring. For example, suppose the user wants to see legacy value across a scenario set. The plot in FIG. 5 shows a sample distribution. It shows, for example, that there are 10,000 scenarios in the scenario set. It also shows, for example, the graph cuts off for scale purposes. Also, for example, the first 1,000 scenarios have a legacy value of zero. This means the portfolio ran out of money and there was no value left for heirs upon the final death of the household.

Figure 6:
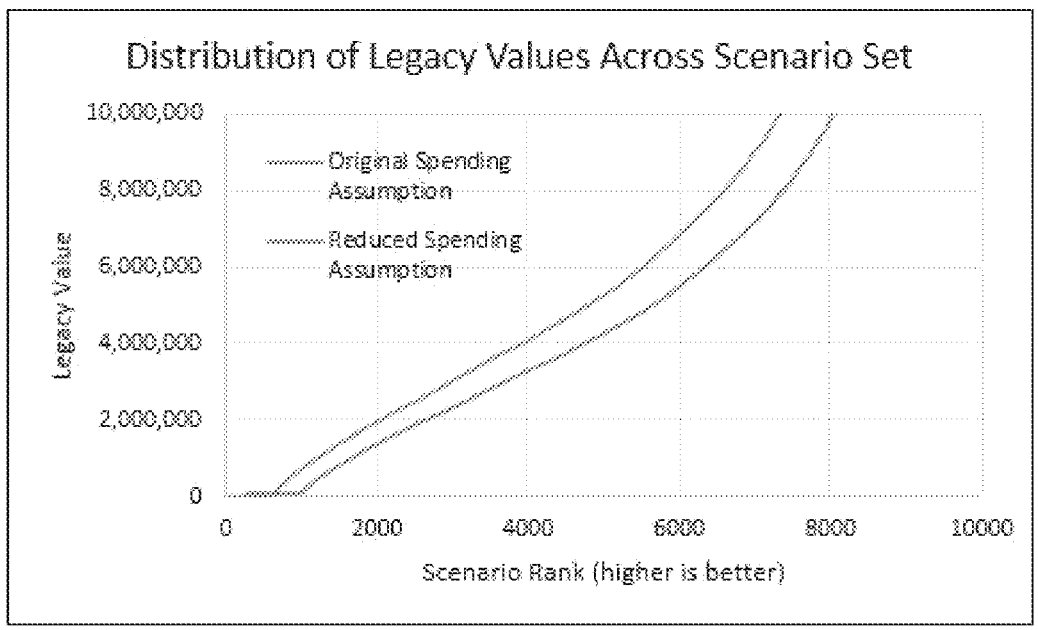

FIG. 6 illustrates another example sorted plot of a variable of a set of scenarios, in accordance with some embodiments of the present disclosure. Assume one of the goals of the household is to leave $2 M to heirs. From the plot in FIG. 6, in approximately 25% of scenarios the legacy value is less than $2 M. One way to increase the "passing" ratio could be to decrease the household spending assumptions. The user can change the spending assumption, re-run the scenario set, and view the resulting plot. The results are shown below of a re-run of the scenario set. As shown in the plot, the household spending increases the legacy value available to heirs across the board.

Besides sorted plots being outputted from a device running method 200A or 200B (e.g., one or more devices running the SEPS 102), such as device can also output bar graphs (e.g., see FIGS. 7, 8, 9, 10, and 11) as well as pivot tables and databases.

One method of analysis of the database uses pivot tables or database queries to detect patterns in the data. With the system, a user can run queries by designing a pivot table based on the available parameters. This type of analysis could be done on any variable or combination of variables.

Bar graphs can be helpful to group the results into ranges. In some embodiments, the method 200A or 200B can include grouping the set of scenarios into subsets of scenarios defined by ranges of a selected variable. And, in some examples the grouping can include grouping the set of scenarios into subsets of scenarios by ranges of lifespan.

Figure 7:
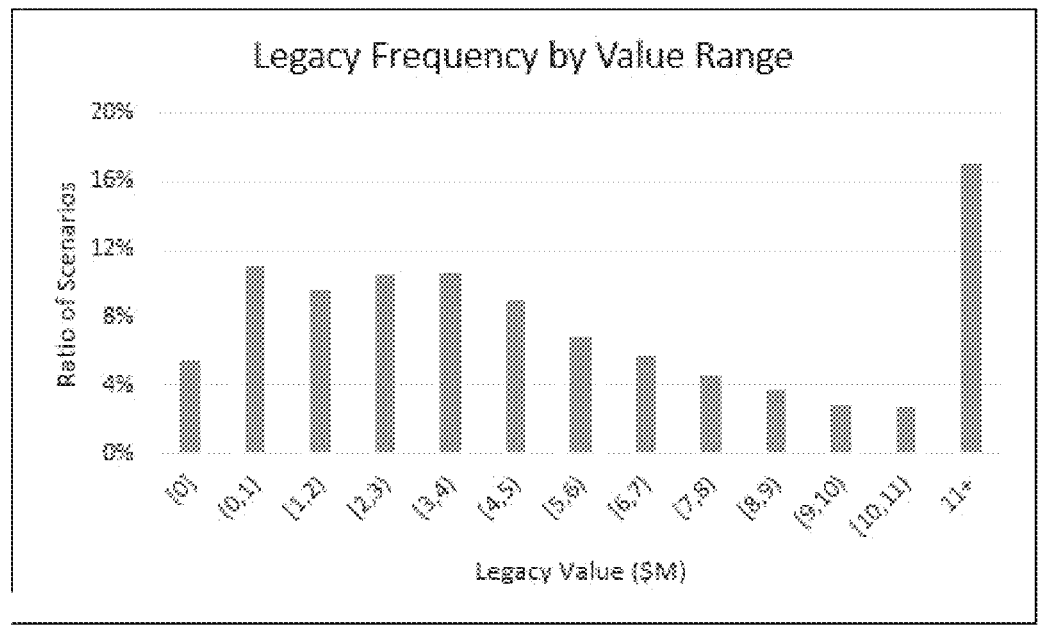
FIGS. 7-11 illustrate example bar graphs of variables of a set of scenarios, in accordance with some embodiments of the present disclosure.

FIG. 7 illustrates an example histogram of a variable of a set of scenarios, in accordance with some embodiments of the present disclosure. Specifically, FIG. 7 shows a histogram of legacy frequency by value range. The legacy frequency is the ratio of individual scenarios in the scenario set that have legacy values in the particular value range, and the value range is a legacy value in millions of dollars ($M).

One of the benefits of the systems and method described herein is the ability to measure a portfolio's sensitivity to mortality (e.g., the risk someone dies too early) and longevity (the risk of living too long). The techniques described herein can establish a framework that can measure financial and insurance products' contribution to the risk and return of the holistic household portfolio.

A household where one member is the primary income earner likely faces significant mortality risk on that individual (the earlier they die, the more risk the portfolio fails). A retirement household where the older spouse has a significant lifetime pension that is meant to support the household's retirement will likely face longevity risk on the younger spouse. To facilitate the identification of patterns, it is useful to group the scenarios into ranges of the variable being analyzed. In this case, it is the lifespans of the household members. For example, one can group the scenarios into quintile ranges of the variable's range across the scenario set.

Figure 8:
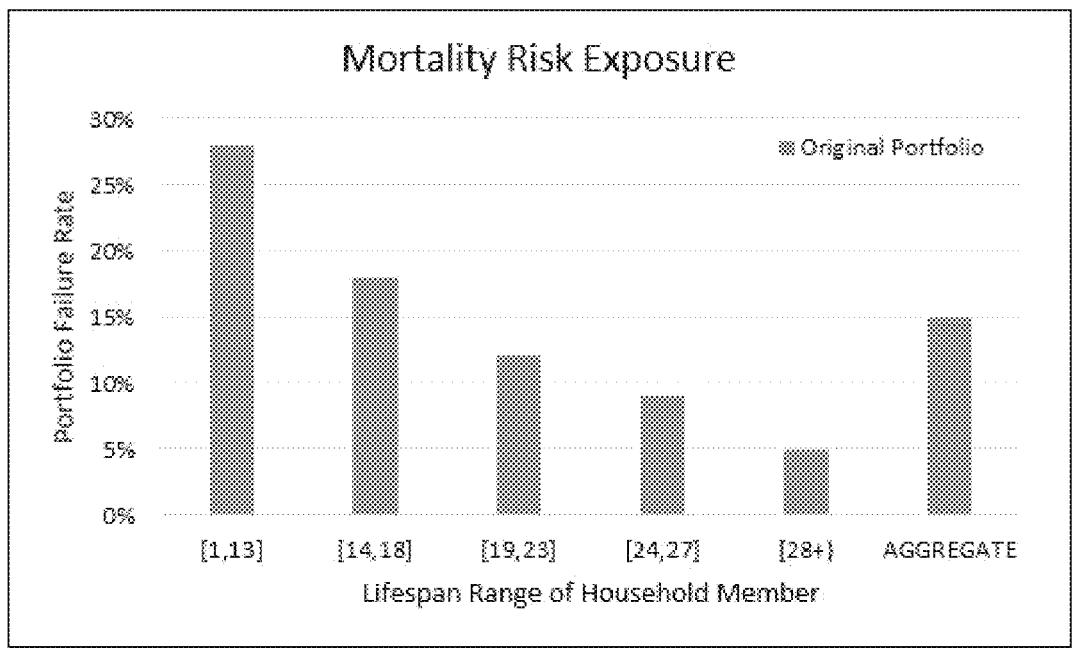

FIG. 8 illustrates an example bar graph of a variable (Household Member's Lifespan), grouped into quintile ranges of its values across the scenario set, and the portfolio failure rate for the groupings. This representation is constructed from an output of a pivot table or database query, in accordance with some embodiments of the present disclosure. The household's portfolio has mortality risk on the member of the household. The shorter the lifespan of the member, the more risk there is to the household's portfolio.

As an example, life insurance can be an effective tool to combat mortality risk. As an example, the user can test adding a term life insurance policy to the portfolio using the system and methods described herein. The policy premium can be deducted from the portfolio, and if a death benefit is paid, the proceeds are added to the portfolio or used for consumption by the remaining household members. The user can re-run the modified portfolio using the same scenario set.

Figure 9:
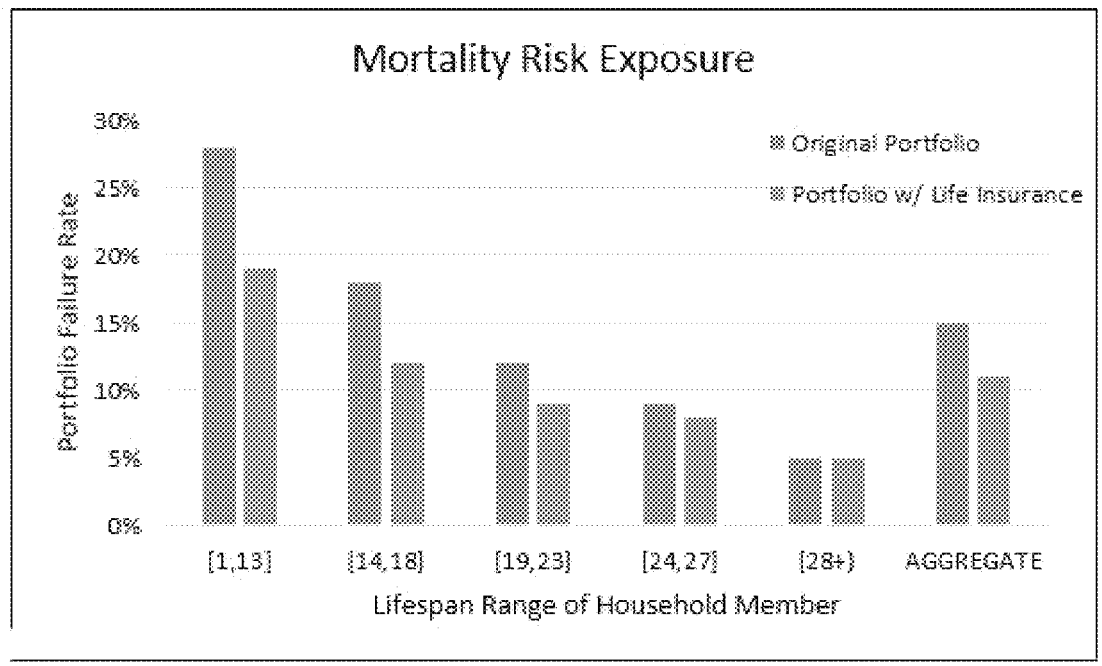

FIG. 9 illustrates another example bar graph of the same variable (Household Member's Lifespan) and the associated portfolio failure rates for the variable ranges, which is derived from an output of a pivot table or a database query, in accordance with some embodiments of the present disclosure. However, in addition to the output from the original portfolio, the bar graph in FIG. 9 shows the re-run of the modified portfolio using the same scenario set after adding the insurance. As shown, the addition of life insurance to the portfolio reduces the failure rate for each lifespan range of the member, and it brings down the failure rate across the entire scenario set (or the aggregate of the scenario set).

Also, a rising failure rate as lifespans of members increase indicates the household is exposed to longevity risk on those members.

Figure 10:
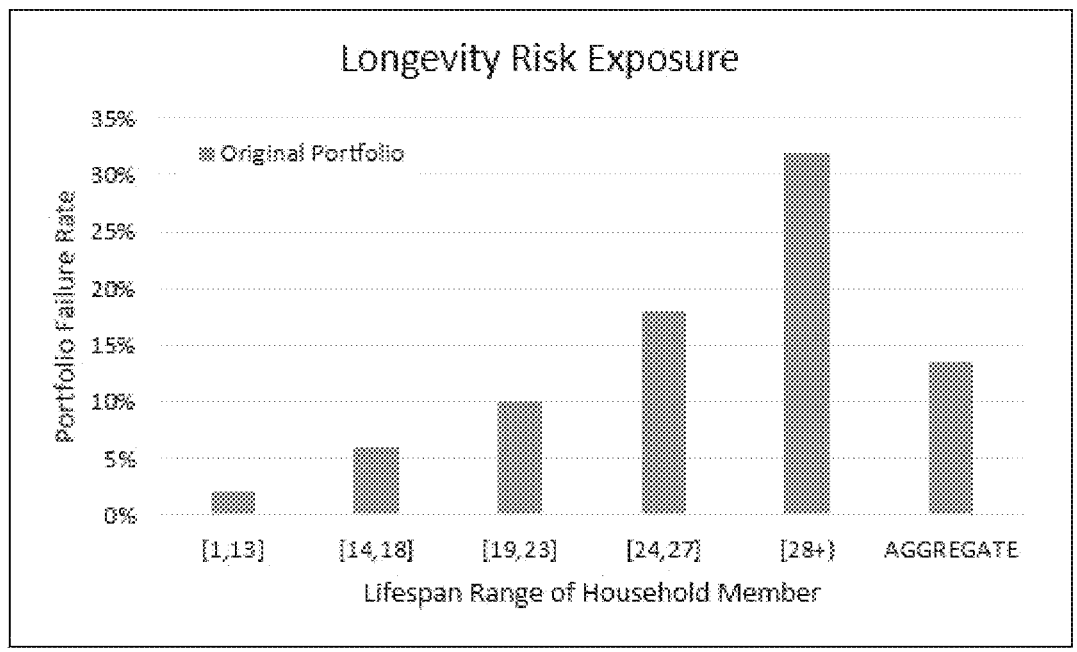

FIG. 10 illustrates an example bar graph of a variable (a Member's Lifespan), grouped into quintile ranges of its values across the scenario set, and the portfolio failure rates for the groupings. This representation is constructed from an output of a pivot table or database query, in accordance with some embodiments of the present disclosure. The household portfolio has longevity risk on the member of the household. The longer the lifespan of the member, the more risk there is to the household's portfolio.

As an example, an annuity can be an effective tool to combat longevity risk. The user can test adding an annuity to the portfolio using the system and methods described herein. The annuity premium can be deducted from the portfolio, and the income from the annuity can be added to the portfolio or used for consumption. The user can re-run the modified portfolio using the same scenario set.

Figure 11:
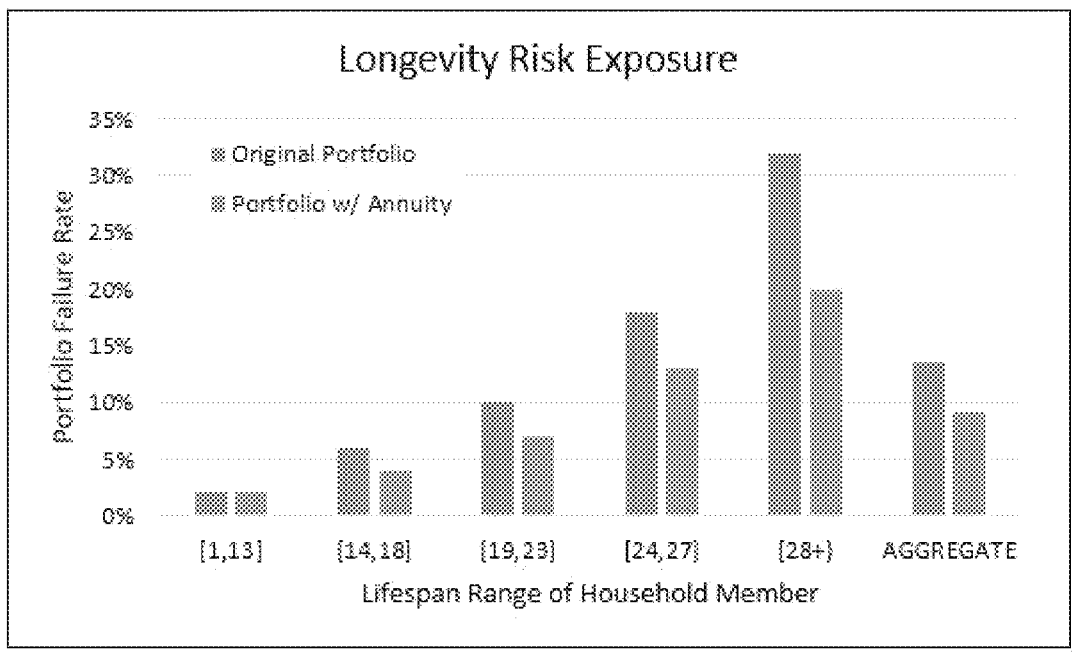

FIG. 11 illustrates another example bar graph of a variable of a set of scenarios, which is derived from an output of a pivot table or database query, in accordance with some embodiments of the present disclosure. However, in addition to the output from the original portfolio, the bar graph in FIG. 11 shows the re-run of the modified portfolio using the same scenario set after adding the annuity. As shown, the addition of an annuity to the portfolio reduces the failure rate for each lifespan range of the individual, and it brings down the failure rate across the entire scenario set (or the aggregate of the scenario set). In other words, similar to adding life insurance to reduce mortality risk, the annuity reduces longevity risk across the lifespan ranges and reduces the risk in aggregate.

In some embodiments, as shown in FIGS. 8-11 for example, the system can use lifespan as a variable. But, it is to be understood that the analysis performed on the results of the Monte Carlo simulation can be performed with respect to any variable. For example, the user could look at portfolio failure rates across different levels of asset returns or asset allocations. In addition, the user can filter certain results to remove extraordinary or abnormal results (e.g., to remove tails of a distribution). An example of this could be to exclude the top and bottom 5% of scenarios with the highest or lowest asset returns.

In some embodiments, the methods and system can output summary statistics, such as the mean, median, standard deviation of the results of multiple simulations and analysis of such simulations. Summary statistics can provide a concise view of how variables and the portfolio in aggregate are performing across a scenario set and provide a way of comparing one portfolio to another efficiently. In the graphs derived from pivot tables or database queries, portfolio failure rate is an example of a summary statistic. As shown in the graphs illustrated in the drawings, the portfolio failure rate is the mean of a binary function that equals 1 if the portfolio fails at any point in a scenario and 0 if the portfolio never fails in the scenario.

Output summary statistics can include risk metrics and value metrics. Risk metrics for a portfolio and/or scenario set can include a portfolio failure rate and a legacy failure rate. Value metrics for a portfolio and/or a scenario set can include a cumulative consumption (e.g., a dollar amount), a legacy value (e.g., a dollar amount), and a total value (e.g., a dollar amount). Portfolio failure rate can be the proportion of scenarios in the scenario set that result in a failure condition (e.g. the failure condition being run out of money too early). Legacy failure rate can be the proportion of scenarios in the scenario set that fail to leave the predetermined desired legacy. Cumulative consumption can be a measure, such as the mean or median, across the scenario set of the cumulative amount of spending in each scenario. The cumulative consumption can be expressed as a present value as well. Present value calculations can take a stream of cash flows and discount future cash flows using some interest rate. Alternative versions include average annual consumption, which divides total consumption by the number of years in the scenario, and this can also be expressed as a present value. Legacy value can be a measure, such as the mean or median, across the scenario set of the after-tax value available to heirs upon the final death of the household or a certain individual in the household. Legacy value can also be a present value. Total value can be the sum of cumulative consumption and legacy value.

In some embodiments, the outputs of the methods and systems described herein can be rendered within a recommendation that can be provided to a user interface of a computing device. For example, outputs disclosed herein for simulating and analyzing household portfolios can be rendered within a recommendation that can be provided to a user interface of a computing device. The outputs can provide an adviser or consumer previously non-existent tools to be able to analyze, build, and test modifications to sets of assets as well as gain a better understanding of the risks facing households. For example, the outputs can provide an adviser or consumer previously non-existent tools to be able to analyze, build, and test modifications to financial portfolios (such as portfolios including investments and insurance) as well as gain a better understanding of the risks facing such portfolios. The methods and systems can be provided through a software platform or a combination of a hardware and software platform.

In some embodiments, the analysis of results of a scenario set and set of assets can be analyzed on a different platform or device from the processing of the scenario set and the set of products through a Monte Carlo simulation. In some embodiments, the first operation of the analysis of the results of the simulation includes defining a utility function to be applied to the results of the simulation (e.g., see block 1202 of method 1200). In some examples, an intuitive and effective utility function can be set equal to a portfolio success rate. In such examples, a portfolio success rate can be one minus the portfolio failure rate. A set of assets (e.g., a portfolio of financial products) can be tested in process iteration i, $\Phi_i$. $\Phi_i = w_{1,i} A_{1,i} + w_{2,i} A_{2,i} \ldots + w_{n,i} A_{n,i}$. In other words, the set of assets tested in process iteration i equals the summation of an amount of asset 1 included for iteration i, an amount of asset 2 included for iteration i, and so on depending on the amount of assets.

It is to be understood that assets do not necessarily mean financial products. An asset can be used to model a decision. Assume modeling whether to take a lump sum or monthly pension. Asset 1 could be the lump sum asset with weight 1 in the first iteration and weight 0 in the second iteration, and Asset 2 could be the monthly pension with weight 0 in the first iteration and weight 1 in the second iteration. An asset can be anything that can produce a cash flow or be liquidated for value.

A utility function of the set of assets can be $U(\Phi)$. In such examples $U(\Phi)$ can equal the proportion of passing scenarios in the scenario set for the set of assets, $\Phi$. Assume $\Phi_0$=50 Asset A+50 Asset B (e.g., 50 units of Asset A and 50 units of Asset B). ($\Phi_0$ can be projected in each of the scenarios of the scenario set. Assume the Portfolio Failure Rate is 15%, In this example, $U(\Phi_0)$=1−0.15=0.85

The analysis can continue with making an educated guess about portfolio modifications that might lead to a lower failure rate, a higher passing rate, and higher utility (e.g., a guess algorithm coded in software and/or hardware). The analysis continues with performing a similar analysis as described for ($\Phi_0$, looking at variables like mortality and longevity risk among others for example. This analysis informs the development of the first guess about modifications to a set of assets that will improve the utility of the set of assets (e.g., improve utility to a financial portfolio).

After running the initial set of assets, $\Phi_0$, the system can select Asset (from an available basket of assets because of its known characteristics (e.g. life insurance mitigates mortality risk) and the analysis of ($\Phi_0$. For example, assume $\Phi_1$=45 Asset A+30 Asset B+25 Asset C. In this case the set of assets still adds up to 100 in aggregate. Assume $U(\Phi_1)$=0.87. The addition of Asset C and modifying the weights of Assets A and B improved the utility of the set of assets, so $\Phi_1$ is deemed more successful than $\Phi_0$. Because Asset C improved the utility, the system might try adding more of Asset C to the set of assets. Assume $\Phi_2$=30 Asset A+30 Asset B+40 Asset C, as well as $U(\Phi_2)$=0.86. In this second iteration, $\Phi_2$ has a lower utility than $\Phi_1$, and therefore $\Phi_1$ is a superior set of assets. The difference between $\Phi_1$ and $\Phi_2$ was a shift from Asset A to Asset C (Asset B remained at 30), The system now can determine that Asset C helped but the shift from Asset A to Asset C was not beneficial. So now the system can try returning Asset C to the level of $\Phi_1$ but shifts the balance towards Asset A and away from Asset B. Assume $\Phi_3$=55 Asset A+20 Asset B+25 Asset C and $U(\Phi_3)$=0.89. $\Phi_3$ in this third iteration is the best set of assets in the example. Given the added utility of increasing Asset A in the set of assets, $\Phi_4$ might include an even higher proportion of Asset A. Such guesses and modifications can continue until a certain level of enhancement or optimization is reached for the set of assets. In other words, the process continues, cycling through the basket of available assets and permissible weights to hone in on an enhanced set of products, $\Phi_{enhanced}$, or an optimal set of products, $\Phi_{optimal}$.

In the abovementioned example, the asset weights can be range bound and subject to other constraints. For example, the user can stipulate that Asset A must have a value of between 10 and 90 in a set of assets or that Asset A must have a value equal to a percentage of the total value of the set of assets.

Figure 12:
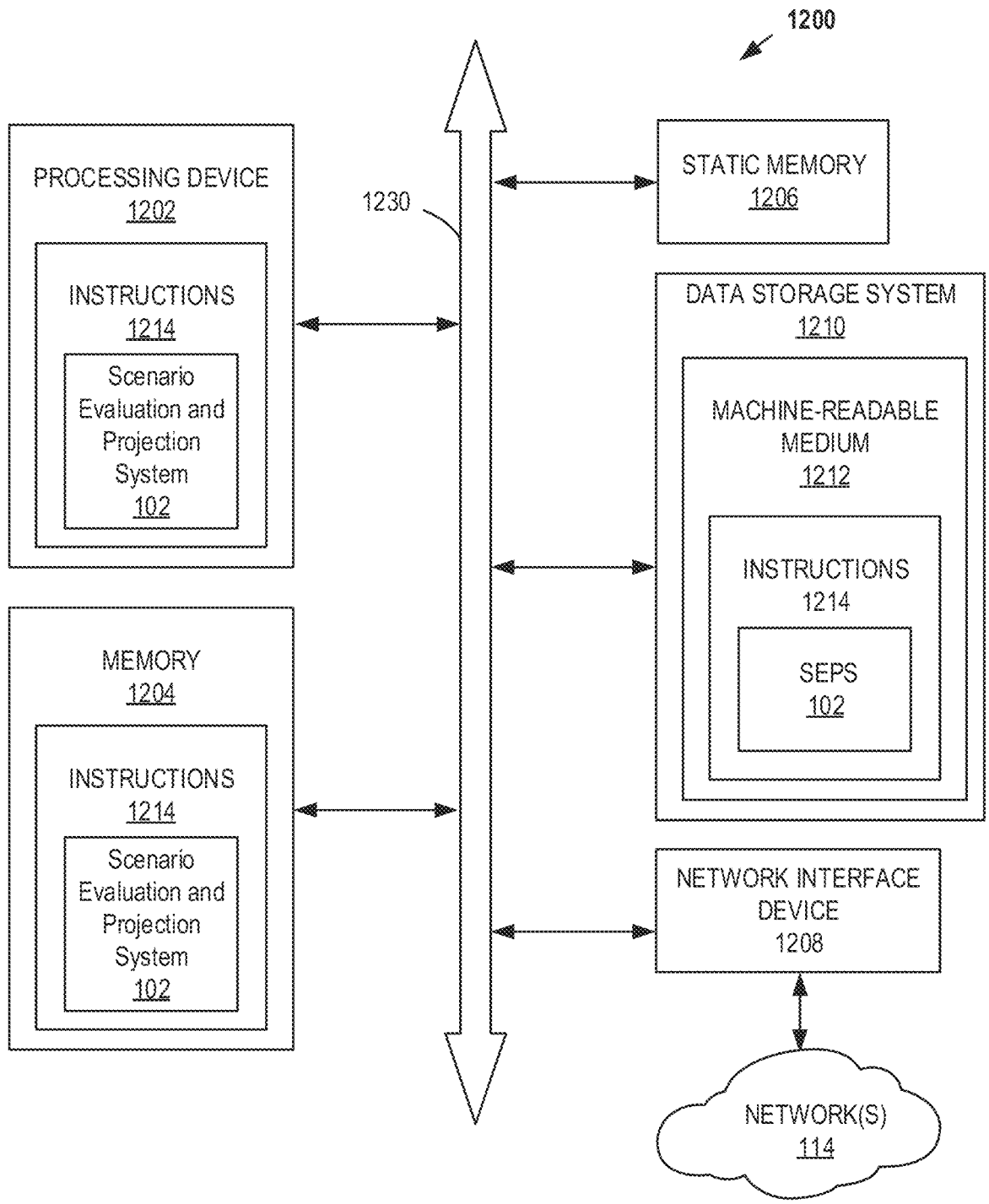
FIG. 12 is a block diagram of example aspects of an example computer system, in accordance with some embodiments of the present disclosure.

FIG. 12 is a block diagram of example aspects of an example computer system 1200, in accordance with some embodiments of the present disclosure. FIG. 12 illustrates parts of the computer system 1200 within which a set of instructions, for causing the machine to perform any one or more of the methodologies discussed herein, can be executed. In some embodiments, the computer system 1200 can correspond to a host system that includes, is coupled to, or utilizes memory or can be used to perform the operations of a controller (e.g., to execute an operating system to perform operations corresponding to the SEPS 102). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random-access memory (DRAM), etc.), a static memory 1206 (e.g., flash memory, static random-access memory (SRAM), etc.), and a data storage system 1210, which communicate with each other via a bus 1230.

The processing device 1202 represents one or more general-purpose processing devices such as a microprocessor, a central processing unit, or the like. More particularly, the processing device can be a microprocessor or a processor implementing other instruction sets, or processors implementing a combination of instruction sets. The processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1214 for performing the operations discussed herein, such as operations associated with the SEPS 102. The computer system 1200 can further include a network interface device 1208 to communicate over the LAN/WAN network(s) 118 of FIG. 1.

The data storage system 1210 can include a machine-readable storage medium 1212 (also known as a computer-readable medium) on which is stored one or more sets of instructions 1214 or software embodying any one or more of the methodologies or functions described herein, such as operations associated with the SEPS 102. The instructions 1214 can also reside, completely or at least partially, within the main memory 1204 and/or within the processing device 1202 during execution thereof by the computer system 1200, the main memory 1204 and the processing device 1202 also constituting machine-readable storage media.

In one embodiment, the instructions 1214 include instructions to implement functionality corresponding to the SEPS 102. While the machine-readable storage medium 1212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for providing enhanced answers for limiting financial risks by repeatedly running Monte Carlo simulations over various scenarios related to financial risks for one or more individuals and using results of the Monte Carlo simulations as input for machine learning repeatedly until the enhanced answers are provided, comprising the following operations:
   (a1) receiving, by a Monte Carlo simulator of a scenario evaluation and projection system (SEPS) running on one or more server computers of a cloud computing environment, a first set of assets for reducing risk from a database of the SEPS;
   (a2) as a starting point of a machine learning process, running, by the Monte Carlo simulator, a Monte Carlo simulation on the first set of assets for reducing risk, the running of the Monte Carlo simulation comprising receiving and using, as input, a set of scenarios;
   (a3) in continuation of the machine learning process, grouping, by projection circuitry of the SEPS running on the one or more server computers of the cloud computing environment and communicatively coupled to the Monte Carlo simulator, the set of scenarios into subsets of scenarios by ranges of lifespan,
      each scenario of the set of scenarios comprising stochastic variables that vary per scenario,
      each scenario of the set of scenarios comprising a randomly generated value for each stochastic variable,
      each value for an actuarial stochastic variable for a scenario of the set of scenarios is created by sampling from a distribution function of the actuarial stochastic variable according to a random number generator (RNG),
      each value for an econometric stochastic variable for a scenario of the set of scenarios is created by sampling from a distribution function of the econometric stochastic variable according to a RNG,
      the stochastic variables for each scenario of the set of scenarios comprises econometric stochastic variables and actuarial stochastic variables, and
      the actuarial stochastic variables comprising an age of death variable, an age of disability variable, a duration of disability variable, an age of long-term care variable, a duration of long-term care variable, or a combination thereof sampled from a table or distribution;
   (b1) in continuation of the machine learning process, analyzing, by the projection circuitry of the SEPS, output of the Monte Carlo simulation,
      the analyzing of the output of the Monte Carlo simulation comprising determining, for each scenario of the set of scenarios, a plurality of scenario outcomes based on a set of failure conditions over a time period, and
      each outcome of the plurality of scenario outcomes being a binary outcome of either pass or fail;
   (b2) generating, by the projection circuitry, graphical representations of the set of scenarios and the plurality of scenario outcomes;

(b3) sending over the Internet to client devices, by the one or more server computers of the cloud computing environment, the generated graphical representations of the set of scenarios and the plurality of scenario outcomes to be provided by respective user interfaces of the client devices;

(c) in continuation of the machine learning process, scoring, by the projection circuitry, the analyzed output of the Monte Carlo simulation on a first set of products according to a utility function,
wherein an output of the utility function shows a degree of passing or failing, and
wherein the degree of passing or failing comprises total income generated, income shortfall relative to a minimum spending benchmark, a final value shortfall to a final value benchmark, any derivative thereof, or any combination thereof;

(d) in continuation of the machine learning process, determining, by the projection circuitry, a second set of assets for reducing risk better than the first set of assets based on historical data;

(e) in continuation of the machine learning process, repeating operations (a1), (a2), (a3), (b1), (b2), (b3), and (c) for the second set of assets;

(f) in continuation of the machine learning process, comparing, by the projection circuitry,
the score for the first set of assets against the score for the second set of assets,
and when the second set of assets is better at reducing risk than the first set of assets according to the comparison, use the second set of assets to determine, by the projection circuitry, a third set of assets for reducing risk better than the second set of assets based on historical data,
and when the first set of assets is better at reducing risk than the second set of assets according to the comparison, use the first set of assets to determine, by the projection circuitry, a third set of assets for reducing risk better than the first set of assets based on historical data;

(g) communicating, by the projection circuitry, the determined third set of assets as feedback to the database to be used by future iterations of operations (a1), (a2), and (a3); and (h) in continuation of the machine learning process, repeating operations (a1), (a2), (a3), (b1), (b2), (b3), (c), (d), (e), (f), and (g) for successive sets of assets, provided after operation (g), until reaching a final set of assets of the successive sets of assets where the scoring for the final set of assets according to the utility function is better than the scoring on any other set of assets of the successive sets of assets.

2. The method of claim 1, wherein the analyzing of the output of the Monte Carlo simulation comprises determining a passing rate according to the pluralities of scenario outcomes for the set of scenarios.

3. The method of claim 1, wherein the first set of assets comprises a household financial portfolio comprising investments, insurance, pensions, inheritances, real property, and other assets, and wherein the risk comprises a probability of not meeting a predefined level of income or assets within a certain period of time.

4. The method of claim 1, wherein the determining the plurality of scenario outcomes is based on the set of failure conditions over a time horizon.

5. The method of claim 1, further comprising prioritizing the set of failure conditions by applying the utility function to the set of failure conditions to score outcomes.

6. The method of claim 5, wherein the utility function for prioritizing the set of failure conditions comprises a variable associated with spending.

7. The method of claim 6, wherein the utility function for prioritizing the set of failure conditions comprises a variable associated with a minimum liquidity requirement.

8. The method of claim 7, wherein the utility function for prioritizing the set of failure conditions comprises a variable associated with a time horizon.

9. The method of claim 8, wherein the utility function for prioritizing the set of failure conditions comprises a variable associated with an ending value.

10. The method of claim 1, wherein the utility function is represented by the following generalization: $Utility_{scenario} = U(S\ V_{min},\ T,\ V_{end})$, and wherein S represents a spending function, $V_{min}$ represents a minimum value requirement, T represents time horizon, and $V_{end}$ represents an ending value.

11. The method of claim 10, wherein S, the spending function, is defined by a fixed amount, indexed with inflation, or a function of variables that include a portfolio value.

12. The method of claim 11, wherein $V_{min}$ is a fixed amount, indexed with inflation, or a function of scenario data including the plurality of scenario outcomes, and wherein $V_{end}$ is a fixed amount, indexed with inflation or a function of the scenario data.

13. The method of claim 12, wherein T, the time horizon, is a fixed time horizon.

14. The method of claim 12, wherein T, the time horizon, is contingent on a range of household members' lifespans.

15. A non-transitory computer-readable storage medium tangibly encoded with computer-executable instructions, that when executed by a processor of a computing device the processor performs a method for providing enhanced answers for limiting financial risks by repeatedly running Monte Carlo simulations over various scenarios related to financial risks for one or more individuals and using results of the Monte Carlo simulations as input for machine learning repeatedly until the enhanced answers are provided, comprising the following operations:

(a1) receiving, by a Monte Carlo simulator of a scenario evaluation and projection system (SEPS) running on one or more server computers of a cloud computing environment, a first set of assets for reducing risk from a database of the SEPS;

(a2) as a starting point of a machine learning process, running, by the Monte Carlo simulator, a Monte Carlo simulation on the first set of assets for reducing risk, the running of the Monte Carlo simulation comprising receiving and using, as input, a set of scenarios;

(a3) in continuation of the machine learning process, grouping, by projection circuitry of the SEPS running on the one or more server computers of the cloud computing environment and communicatively coupled to the Monte Carlo simulator, the set of scenarios into subsets of scenarios by ranges of lifespan,
each scenario of the set of scenarios comprising stochastic variables that vary per scenario,
each scenario of the set of scenarios comprising a randomly generated value for each stochastic variable,
each value for an actuarial stochastic variable for a scenario of the set of scenarios is created by sampling from a distribution function of the actuarial stochastic variable according to a random number generator (RNG), each value for an econometric stochastic variable for a scenario of the set of scenarios is created by sampling from a distribution function of the econometric stochastic variable according to a RNG, the stochastic variables for each scenario of the set of scenarios comprises econometric stochastic variables and actuarial stochastic variables, and the actuarial stochastic variables comprising an age of death variable, an age of disability variable, a duration of disability variable, an age of long-term care variable, a duration of long-term care variable, or a combination thereof sampled from a table or distribution;

(b1) in continuation of the machine learning process, analyzing, by the projection circuitry of the SEPS, output of the Monte Carlo simulation, the analyzing of the output of the Monte Carlo simulation comprising determining, for each scenario of the set of scenarios, a plurality of scenario outcomes based on a set of failure conditions over a time period, and each outcome of the plurality of scenario outcomes being a binary outcome of either pass or fail;

(b2) generating, by the projection circuitry, graphical representations of the set of scenarios and the plurality of scenario outcomes;

(b3) sending over the Internet to client devices, by the one or more server computers of the cloud computing environment, the generated graphical representations of the set of scenarios and the plurality of scenario outcomes to be provided by respective user interfaces of the client devices;

(c) in continuation of the machine learning process, scoring, by the projection circuitry, the analyzed output of the Monte Carlo simulation on a first set of products according to a utility function, wherein an output of the utility function shows a degree of passing or failing, and wherein the degree of passing or failing comprises total income generated, income shortfall relative to a minimum spending benchmark, a final value shortfall to a final value benchmark, any derivative thereof, or any combination thereof;

(d) in continuation of the machine learning process, determining, by the projection circuitry, a second set of assets for reducing risk better than the first set of assets based on historical data;

(e) in continuation of the machine learning process, repeating operations (a1), (a2), (a3), (b1), (b2), (b3), and (c) for the second set of assets;

(f) in continuation of the machine learning process, comparing, by the projection circuitry, the score for the first set of assets against the score for the second set of assets, and when the second set of assets is better at reducing risk than the first set of assets according to the comparison, use the second set of assets to determine, by the projection circuitry, a third set of assets for reducing risk better than the second set of assets based on historical data, and when the first set of assets is better at reducing risk than the second set of assets according to the comparison, use the first set of assets to determine, by the projection circuitry, a third set of assets for reducing risk better than the first set of assets based on historical data;

(g) communicating, by the projection circuitry, the determined third set of assets as feedback to the database to be used by future iterations of operations (a1), (a2), and (a3); and (h) in continuation of the machine learning process, repeating operations (a1), (a2), (a3), (b1), (b2), (b3), (c), (d), (e), (f), and (g) for successive sets of assets, provided after operation (g), until reaching a final set of assets of the successive sets of assets where the scoring for the final set of assets according to the utility function is better than the scoring on any other set of assets of the successive sets of assets.

16. The non-transitory computer-readable storage medium of claim 15, wherein the analyzing of the output of the Monte Carlo simulation comprises determining a passing rate according to the pluralities of scenario outcomes for the set of scenarios.

17. The non-transitory computer-readable storage medium of claim 15, wherein the first set of assets comprises a household financial portfolio comprising investments, insurance, pensions, inheritances, real property, and other assets, and wherein the risk comprises a probability of not meeting a predefined level of income or assets within a certain period of time.

18. The non-transitory computer-readable storage medium of claim 15, wherein the determining the plurality of scenario outcomes is based on the set of failure conditions over a time horizon.

19. The non-transitory computer-readable storage medium of claim 15, further comprising prioritizing the set of failure conditions by applying the utility function to the set of failure conditions to score outcomes, wherein the utility function for prioritizing the set of failure conditions comprises a variable associated with spending, wherein the utility function for prioritizing the set of failure conditions comprises a variable associated with a minimum liquidity requirement, wherein the utility function for prioritizing the set of failure conditions comprises a variable associated with a time horizon, and wherein the utility function for prioritizing the set of failure conditions comprises a variable associated with an ending value.

20. A system, comprising a computing device, comprising a processor and a non-transitory computer-readable storage medium for tangibly storing thereon computer program code for execution by the processor to provide enhanced answers for limiting financial risks by repeatedly running Monte Carlo simulations over various scenarios related to financial risks for one or more individuals and using results of the Monte Carlo simulations as input for machine learning repeatedly until the enhanced answers are provided, the computer program code comprising:

executable logic (a1) for receiving, by a Monte Carlo simulator of a scenario evaluation and projection system (SEPS) running on one or more server computers of a cloud computing environment, a first set of assets for reducing risk from a database of the SEPS;

executable logic (a2) for running, by the Monte Carlo simulator, a Monte Carlo simulation on the first set of assets for reducing risk, the running of the Monte Carlo simulation comprising receiving and using, as input, a set of scenarios, as a starting point of a machine learning process;

executable logic (a3) for grouping, by projection circuitry of the SEPS running on the one or more server computers of the cloud computing environment and communicatively coupled to the Monte Carlo simulator, the set of scenarios into subsets of scenarios by ranges of lifespan, in continuation of the machine learning process, each scenario of the set of scenarios comprising stochastic variables that vary per scenario, each scenario of the set of scenarios comprising a randomly generated value for each stochastic variable, each value for an actuarial stochastic variable for a scenario of the set of scenarios is created by sampling from a distribution function of the actuarial stochastic variable according to a random number generator (RNG), each value for an econometric stochastic variable for a scenario of the set of scenarios is created by sampling from a distribution function of the econometric stochastic variable according to a RNG, the stochastic variables for each scenario of the set of scenarios comprises econometric stochastic variables and actuarial stochastic variables, and the actuarial stochastic variables comprising an age of death variable, an age of disability variable, a duration of disability variable, an age of long-term care variable, a duration of long-term care variable, or a combination thereof sampled from a table or distribution;

executable logic (b1) for analyzing, by the projection circuitry of the SEPS, output of the Monte Carlo simulation, in continuation of the machine learning process, the analyzing of the output of the Monte Carlo simulation comprising determining, for each scenario of the set of scenarios, a plurality of scenario outcomes based on a set of failure conditions over a time period, and each outcome of the plurality of scenario outcomes being a binary outcome of either pass or fail;

executable logic (b2) for generating, by the projection circuitry, graphical representations of the set of scenarios and the plurality of scenario outcomes;

executable logic (b3) for sending over the Internet to client devices, by the one or more server computers of the cloud computing environment, the generated graphical representations of the set of scenarios and the plurality of scenario outcomes to be provided by respective user interfaces of the client devices;

executable logic (c) for scoring, by the projection circuitry, the analyzed output of the Monte Carlo simulation on a first set of products according to a utility function, wherein an output of the utility function shows a degree of passing or failing, and wherein the degree of passing or failing comprises total income generated, income shortfall relative to a minimum spending benchmark, a final value shortfall to a final value benchmark, any derivative thereof, or any combination thereof;

executable logic (d) for determining, by the projection circuitry, a second set of assets for reducing risk better than the first set of assets based on historical data, in continuation of the machine learning process;

executable logic (e) for repeating operations (a1), (a2), (a3), (b2), (b3), and (c) for the second set of assets, in continuation of the machine learning process;

executable logic (f) for comparing, by the projection circuitry, the score for the first set of assets against the score for the second set of assets, in continuation of the machine learning process, and when the second set of assets is better at reducing risk than the first set of assets according to the comparison, use the second set of assets to determine, by the projection circuitry, a third set of assets for reducing risk better than the second set of assets based on historical data, and when the first set of assets is better at reducing risk than the second set of assets according to the comparison, use the first set of assets to determine, by the projection circuitry, a third set of assets for reducing risk better than the first set of assets based on historical data;

executable logic (g) for communicating, by the projection circuitry, the determined third set of assets as feedback to the database to be used by future iterations of operations (a1), (a2), and (a3); and executable logic (h) for repeating operations (a1), (a2), (a3), (b1), (b2), (b3), (c), (d), (e), (f), and (g) for successive sets of assets, provided after operation (g), until reaching a final set of assets of the successive sets of assets where the scoring for the final set of assets according to the utility function is better than the scoring on any other set of assets of the successive sets of assets, in continuation of the machine learning process.

* * * * *